US012665721B2

(12) United States Patent   (10) Patent No.: US 12,665,721 B2
Liu et al.   (45) Date of Patent: Jun. 23, 2026

(54) COMMUNICATION PROCESSING METHOD AND COMMUNICATION PROCESSING APPARATUS

(71) Applicant: HUAWEI TECHNOLOGIES CO., LTD., Guangdong (CN)

(72) Inventors: Fengwei Liu, Chengdu (CN); Lei Chen, Shenzhen (CN); Minghui Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 363 days.

(21) Appl. No.: 18/400,301

(22) Filed: Dec. 29, 2023

(65) Prior Publication Data

US 2024/0195568 A1   Jun. 13, 2024

Related U.S. Application Data

(63) Continuation of application No. PCT/CN2022/101468, filed on Jun. 27, 2022.

(30) Foreign Application Priority Data

Jun. 30, 2021   (CN) ......................... 202110745651.3

(51) Int. Cl.
*H04L 5/00* (2006.01)
*H04B 7/06* (2006.01)

(52) U.S. Cl.
CPC ......... *H04L 5/0051* (2013.01); *H04B 7/0691* (2013.01)

(58) Field of Classification Search
None
See application file for complete search history.

(56) References Cited

U.S. PATENT DOCUMENTS

| | | | |
|---|---|---|---|
| 2001/0020915 A1 | 9/2001 | Proctor | |
| 2019/0393931 A1* | 12/2019 | Huang | ................. H04B 7/0469 |
| 2020/0119788 A1* | 4/2020 | Huang | ................. H04B 7/0626 |

FOREIGN PATENT DOCUMENTS

JP   2020523912 A   8/2020

OTHER PUBLICATIONS

Extended European Search Report for Application No. 22831948 dated Sep. 20, 2024, 7 pages.
Office Action dated Nov. 19, 2024 for Japanese Patent Application No. 2023-580703, 3 pages, with translation.
3GPP TSG RAN Meeting #86 RP-193076,"On scope of Rel-17 NR MIMO",Intel Corporation,Sitges,Spain,Dec. 9-12, 2019,total 5 pages.

* cited by examiner

*Primary Examiner* — Hong S Cho

(57)   ABSTRACT

This disclosure describes a communication processing method. A method according to this disclosure includes: A terminal device determines first weight vectors respectively corresponding to M antenna element set groups. At least one antenna element set group in the M antenna element set groups includes at least two antenna element sets, and a first weight vector corresponding to each of the at least one antenna element set group includes at least two elements. Each element is corresponding to one antenna element set in the antenna element set group, and each element is used to adjust a phase of an antenna element included in the antenna element set corresponding to the element. Different elements correspond to different antenna element sets. M is an integer greater than or equal to 1.

20 Claims, 18 Drawing Sheets

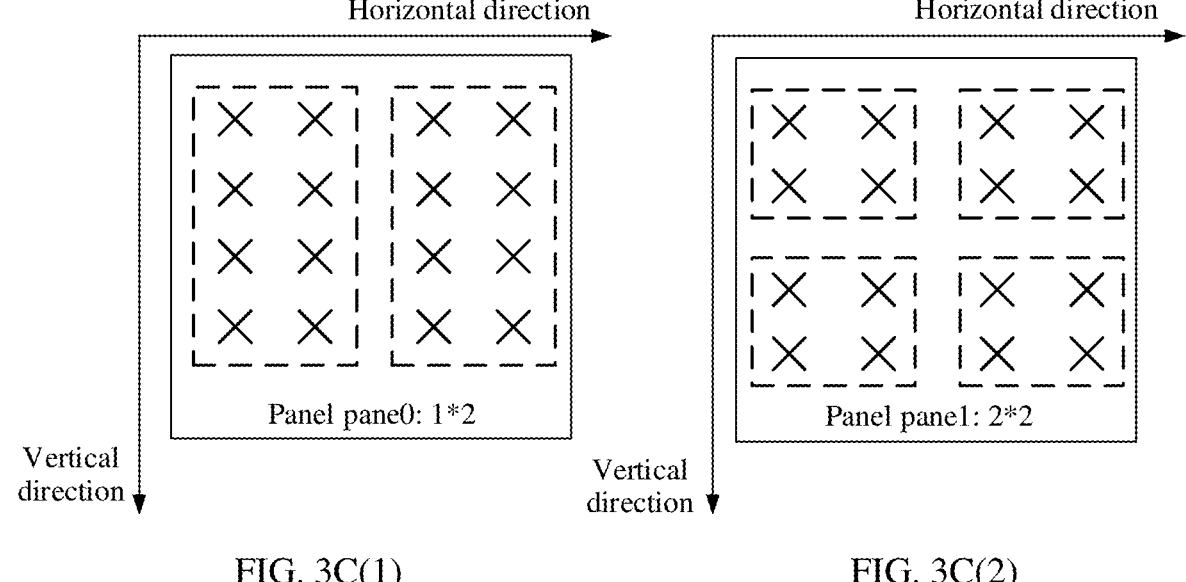
FIG. 3C(1)                    FIG. 3C(2)

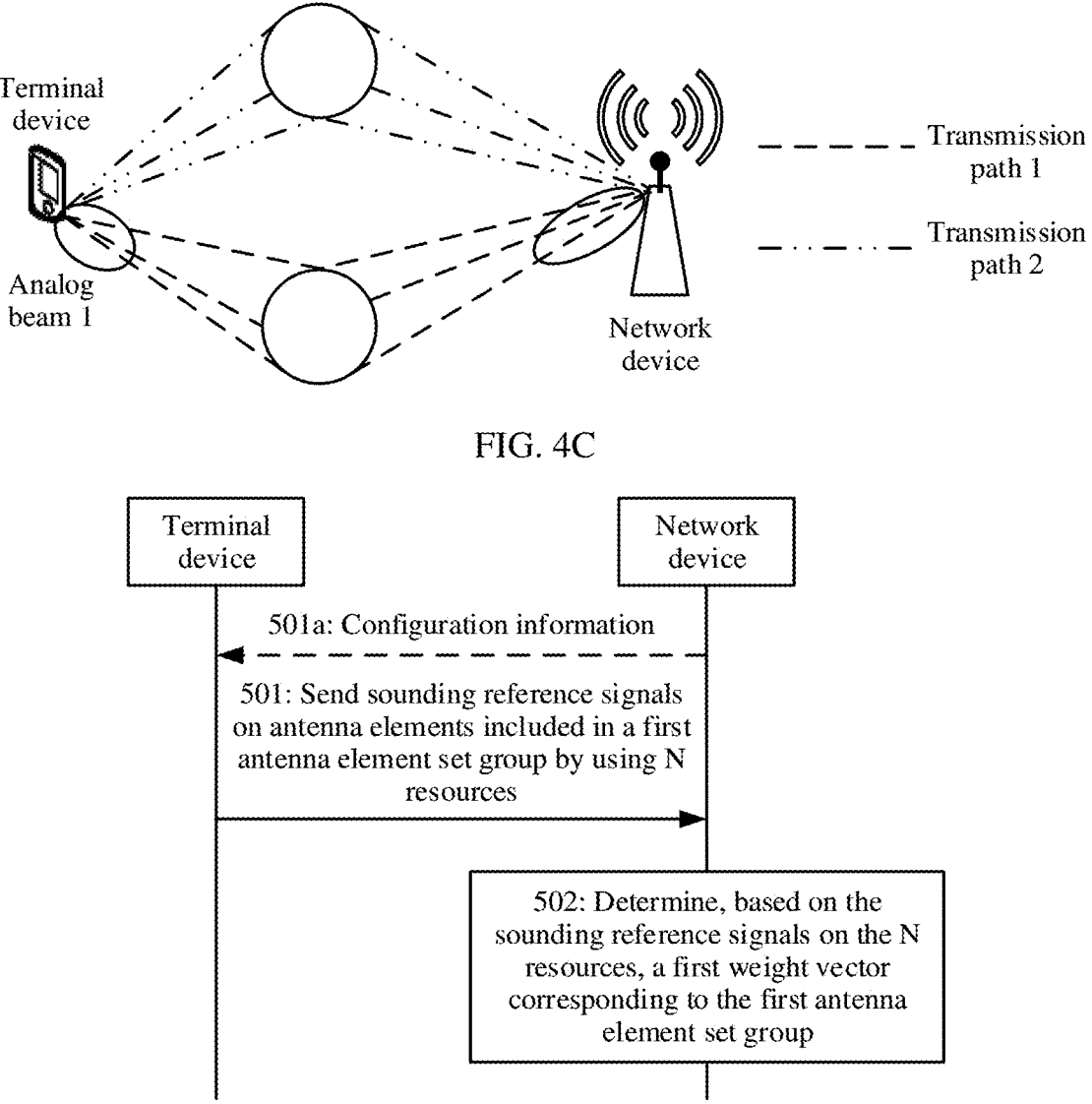

Terminal device

Analog beam 1

Network device

– – – – – Transmission path 1

– · – · – · Transmission path 2

FIG. 4C

Terminal device

Network device

501a: Configuration information

501: Send sounding reference signals on antenna elements included in a first antenna element set group by using N resources 502: Determine, based on the sounding reference signals on the N resources, a first weight vector corresponding to the first antenna element set group

FIG. 5

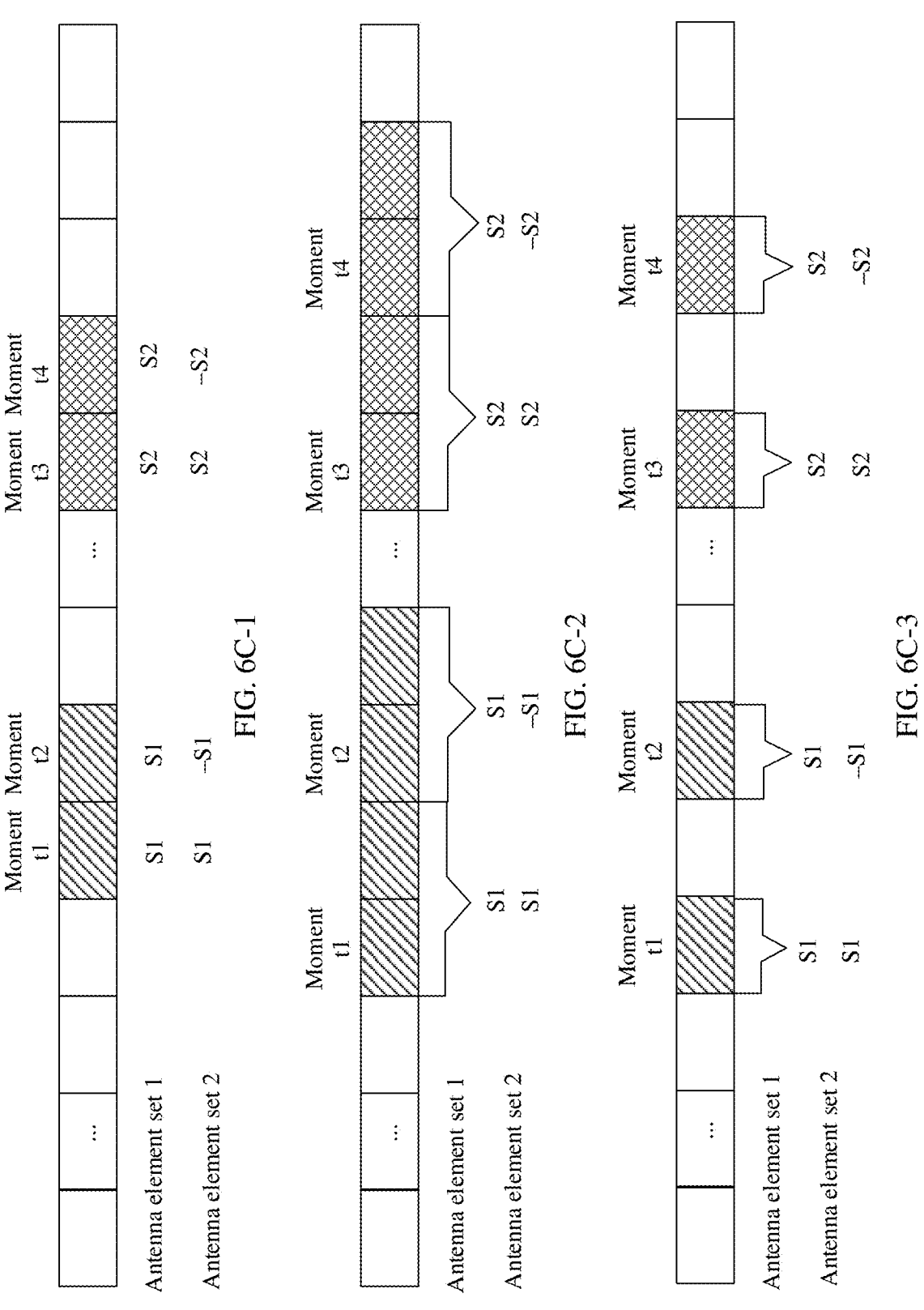

COMMUNICATION PROCESSING METHOD AND COMMUNICATION PROCESSING APPARATUS

CROSS-REFERENCE TO RELATED APPLICATIONS

This application is a continuation of International Application No. PCT/CN2022/101468, filed on Jun. 27, 2022, which claims priority to Chinese Patent Application No. 202110745651.3, filed on Jun. 30, 2021. The disclosures of the aforementioned applications are hereby incorporated by reference in their entireties.

TECHNICAL FIELD

This disclosure relates to the field of communication technologies, and in particular, to a communication processing method and a communication processing apparatus.

BACKGROUND

High frequency bands or millimeter-wave bands feature abundant frequency band resources, and therefore have been used in the industry to meet increasing communication requirements. A typical characteristic of the high frequency bands or the millimeter-wave bands is a large bandwidth. However, a signal path loss is large due to factors such as an atmospheric loss and/or rain fade, and consequently a signal coverage distance is short. To resolve the problem that the signal coverage distance is short due to the large signal path loss, large-scale antenna elements are used in the high frequency bands or the millimeter-wave bands, to generate a high-gain analog narrow beam. A terminal device sends a signal through the analog narrow beam. In this way, a signal gain is increased, and the signal coverage distance is increased.

Currently, the terminal device determines a beam direction based on a transmission configuration indicator (TCI) state configured by a network device. The terminal device sends data in the beam direction. Beam directions corresponding to the TCI state indicated by the network device are limited. A size of the terminal device is limited, a quantity of antennas supported by the terminal device is small, and beam directions supported by the terminal device are limited. Therefore, the terminal device can select a beam direction only from an agreed beam direction set.

It can be learned that beam directions that can be selected by the terminal device are limited. Consequently, the beam directions selected by the terminal device cannot well match a channel characteristic, affecting communication performance.

SUMMARY

Embodiments of this disclosure provide a communication processing method. According to the method, a terminal device sends a signal through an analog beam that better matches a channel characteristic, to improve spectrum utilization and improve communication performance.

A first aspect of embodiments of this disclosure provides a communication processing method. The method includes:

A terminal device determines first weight vectors respectively corresponding to M antenna element set groups. At least one antenna element set group in the M antenna element set groups includes at least two antenna element sets, and a first weight vector corresponding to each of the at least one antenna element set group includes at least two elements. Each element is corresponding to one antenna element set in the antenna element set group, and each element is used to adjust a phase of an antenna element included in the antenna element set corresponding to the element. Different elements are corresponding to different antenna element sets. M is an integer greater than or equal to 1. The terminal device sends, based on the first weight vectors respectively corresponding to the M antenna element set groups, a signal on antenna elements included in the M antenna element set groups.

In the foregoing technical solution, at least one antenna element set group in the M antenna element set groups includes at least two antenna element sets, and a first weight vector corresponding to each of the at least one antenna element set group includes at least two elements. Each element is corresponding to one antenna element set in each antenna element set group, and each element is used to adjust a phase of an antenna element included in the antenna element set corresponding to the element. It can be learned that each antenna element set in the at least one antenna element set group is corresponding to one element. Each element is used to adjust the phase of the antenna element included in the antenna element set corresponding to each element. The terminal device sends, based on the first weight vectors respectively corresponding to the M antenna element set groups, a signal on antenna elements included in the M antenna element set groups. This helps the terminal device send the signal through an analog beam that better matches a channel characteristic, improving spectrum utilization and improving communication performance.

In a possible implementation, the method further includes:

The terminal device receives indication information from a network device. The indication information indicates the first weight vectors respectively corresponding to the M antenna element set groups of the terminal device.

It can be learned that the terminal device receives the indication information from the network device, and the indication information indicates the first weight vector. In other words, the network device participates in a process in which the terminal device determines an analog beam. This helps the terminal device send the signal through an analog beam that better matches a channel characteristic.

In another possible implementation, the M antenna element set groups include a first antenna element set group, and the first antenna element set group includes at least two antenna element sets. The method further includes: The terminal device sends sounding reference signals to the network device on antenna elements included in the first antenna element set group by using N resources. Time domain resources respectively occupied by the N resources are different, and the sounding reference signals sent on the N resources are based on different second weight vectors of the first antenna element set group. The second weight vector includes at least two elements, each of the at least two elements is corresponding to one antenna element set included in the first antenna element set, and each of the at least two elements is used to adjust a phase of an antenna element included in the antenna element set corresponding to the element. Different elements are corresponding to different antenna element sets.

The terminal device sends the sounding reference signals according to the foregoing implementation, so that the network device may obtain channel information of a higher dimension. The network device may determine, based on the obtained channel information, a condition that an analog beam of the terminal device should meet, and indicate the first weight vector of the first antenna element set group to the terminal device. In other words, the network device participates in a process in which the terminal device determines an analog beam. The terminal device may determine, based on the first weight vector, the analog beam that better matches the channel characteristic, and send the signal through the analog beam, to enhance energy of the signal received by the network device, improve spectrum utilization, and improve communication performance.

In another possible implementation, the time domain resources respectively occupied by the N resources are consecutive.

In this possible implementation, the N resources are consecutive in time domain, so that channel time variability in an interval between a start time domain position of a first resource in the N resources and an end time domain position of an $N^{th}$ resource may be ignored.

In another possible implementation, N is a quantity of antenna element sets included in the first antenna element set group.

In this possible implementation, the terminal device sends the sounding reference signals by using the N resources, so that the network device may obtain information about a channel between each antenna element set included in the first antenna element set group and a receive antenna or a receive channel by using the sounding reference signals.

In another possible implementation, the N resources are corresponding to N second weight vectors.

If the second weight vector is a column vector, any two row vectors in a first matrix formed by the N second weight vectors are orthogonal to each other.

Alternatively, if the second weight vector is a row vector, any two column vectors in a second matrix formed by the N second weight vectors are orthogonal to each other.

In the foregoing implementation, the sounding reference signals on the N resources meet orthogonality by using the row vector of the first matrix or the column vector of the second matrix, so that the network device obtains channel information of a higher dimension.

In another possible implementation, each row vector of the first matrix is an orthogonal code.

In the foregoing implementation, the sounding reference signals on the N resources meet orthogonality by using the orthogonal code, so that the network device obtains channel information of a higher dimension.

In another possible implementation, each column vector of the second matrix is an orthogonal code.

In the foregoing implementation, the sounding reference signals on the N resources meet orthogonality by using the orthogonal code, so that the network device obtains channel information of a higher dimension.

In another possible implementation, the orthogonal code includes any one of the following: an orthogonal cover code (OCC) code, a discrete Fourier transformation (DFT) code, or a time domain code division multiplexing (TD-CDM) code.

The foregoing implementations show a plurality of possible implementations of the orthogonal code, so that the sounding reference signals on the N resources meet orthogonality by using the orthogonal code. In the foregoing implementation, the DFT code may be used to more flexibly configure weights on different antenna element sets. For example, phase-shift values corresponding to different antenna element sets are not limited to 0 or $\pm\pi$, improving flexibility of adjusting a phase of an antenna element.

In another possible implementation, the second weight vector is a column vector.

The N second weight vectors include two second weight vectors, and orthogonal codes of the two second weight vectors are respectively $[1\ 1]^T$ and $[1\ -1]^T$.

Alternatively, the N second weight vectors include four second weight vectors, and orthogonal codes of the four second weight vectors are respectively $[1\ 1\ 1\ 1]^T$, $[1\ 1\ -1\ -1]^T$, $[1\ -1\ 1\ -1]^T$, and $[1\ -1\ -1\ 1]^T$.

In the foregoing implementation, an example in which N is 2, the second weight vector is the column vector, and the second weight vector is the OCC code is provided, and an example in which N is 4, the second weight vector is the column vector, and the second weight vector is the OCC code is provided. This provides a possible implementation for implementing the solution, and improves implementability of the solution.

In another possible implementation, the second weight vector is a row vector.

The N second weight vectors include two second weight vectors, and orthogonal codes of the two second weight vectors are respectively $[1\ 1]$ and $[1\ -1]$.

Alternatively, the N second weight vectors include four second weight vectors, and orthogonal codes of the four second weight vectors are respectively $[1\ 1\ 1\ 1]$, $[1\ 1\ -1\ -1]$, $[1\ -1\ 1\ -]$, and $[1\ -1\ -1\ 1]$.

In the foregoing implementation, an example in which N is 2, the second weight vector is the row vector, and the second weight vector is the OCC code is provided, and an example in which N is 4, the second weight vector is the row vector, and the second weight vector is the OCC code is provided. This provides a possible implementation for implementing the solution, and improves implementability of the solution.

In another possible implementation, the sounding reference signals sent on different resources in the N resources have different sequences.

In this possible implementation, the sounding reference signals sent on the N resources are different, enhancing randomness of the sounding reference signals. Different sequences have different performance in different channel conditions. Therefore, when the terminal device sends different sequences of the sounding reference signals on the N resources, interference to another signal may be randomized, and average channel estimation performance is achieved in different channel conditions, improving robustness or stability of the channel estimation performance in different channel conditions.

In another possible implementation, that the terminal device receives indication information from a network device includes:

The terminal device receives downlink control information (DCI) from the network device, where the DCI carries indication information of the first weight vectors respectively corresponding to the M antenna element set groups.

In this possible implementation, the terminal device may determine the first weight vectors respectively corresponding to the M antenna element set groups by receiving the DCI from the network device.

In another possible implementation, the DCI includes an analog transmit precoding matrix indication (A-TPMI), and the A-TPMI indicates a precoding matrix and the first weight vector.

In this possible implementation, the precoding matrix and the first weight vector may be indicated by using the A-TPMI. In this way, bit indication overheads of the DCI may be reduced, and bit resources consumed may be reduced.

In another possible implementation, that the terminal device receives indication information from a network device includes:

The terminal device receives radio resource control (RRC) signaling or a media access control control element (MAC CE) from the network device. The RRC signaling or the MAC CE includes the indication information.

In this possible implementation, another two types of carriers of the indication information are provided, to provide a basis for implementing the solution and improve diversity of the solution.

In another possible implementation, the method further includes: The terminal device sends capability information to the network device.

The capability information includes at least one of the following: information indicating whether the terminal device supports division of antenna elements into antenna element sets, a quantity of antenna element sets supported by the terminal device, and an arrangement manner of the antenna element sets of the terminal device.

In this possible implementation, the terminal device may report the capability information to the network device, so that the network device configures an appropriate first weight vector for the terminal device, ensuring implementation of the solution.

In another possible implementation, the indication information indicates index information of the first weight vector. That the terminal device determines the first weight vector based on the indication information includes: The terminal device determines the first weight vector based on the index information of the first weight vector.

Alternatively, the indication information indicates phase information of an element in the first weight vector. That the terminal device determines the first weight vector based on the indication information includes: The terminal device determines the first weight vector based on the phase information of the element in the first weight vector.

Alternatively, the indication information indicates an amplitude-phase weighted value. The amplitude-phase weighted value includes a plurality of elements, and each element in the amplitude-phase weighted value is corresponding to one fourth weight vector. That the terminal device determines the first weight vector based on the indication information includes: The terminal device determines a plurality of third weight vectors based on the amplitude-phase weighted value and a plurality of fourth weight vectors. The terminal device determines the first weight vector based on the plurality of third weight vectors.

In this possible implementation, a plurality of possible implementations in which the indication information indicates the first weight vector and a corresponding specific process in which the terminal device determines the first weight vector are provided, improving diversity of the solution. In addition, indication overheads of the network device may be reduced in the foregoing indication manner.

In another possible implementation, the method further includes:

The terminal device receives configuration information from the network device, where the configuration information includes time-frequency position information of the N resources and the N second weight vectors corresponding to the N resources.

In this possible implementation, the terminal device may receive the configuration information from the network device, to determine the N second weight vectors and related information of the N resources, so that the terminal device sends the sounding reference signals on the N resources.

In another possible implementation, that the terminal device sends, based on the first weight vector, a signal on antenna elements included in the M antenna element set groups includes:

The terminal device determines a first phase-shift value based on a transmission configuration indicator (TCI) state and a synchronization signal and physical broadcast channel block (SSB) index associated with the TCI state. Alternatively, the terminal device determines a first phase-shift value based on a TCI state and a non-zero power channel state information reference signal (CSI-RS) resource index associated with the TCI state. The terminal device separately adjusts, based on the first weight vector and the first phase-shift value, phase-shift values of the antenna elements included in the M antenna element set groups. The terminal device sends the signal through the antenna elements included in the M antenna element set groups.

The foregoing implementation shows a specific process in which the terminal device sends the signal based on the first weight vector. The terminal device may first determine a first phase-shift value of an antenna element, and then determine a second phase-shift value of the antenna element with reference to the first weight vector. The terminal device adjusts the phase-shift value of the antenna element based on the first phase-shift value and the second phase-shift value, and then sends the signal on the antenna element. Therefore, the terminal device sends the signal through an analog beam that better matches a channel variation characteristic, improving communication transmission performance.

A second aspect of embodiments of this disclosure provides a communication processing method. The method includes:

A network device determines first weight vectors respectively corresponding to M antenna element set groups of a terminal device. At least one antenna element set group in the M antenna element set groups includes at least two antenna element sets, and a first weight vector corresponding to each of the at least one antenna element set group includes at least two elements. Each element is corresponding to one antenna element set in each antenna element set group, and each element is used to adjust a phase of an antenna element included in the antenna element set corresponding to the element. Different elements are corresponding to different antenna element sets. M is an integer greater than or equal to 1. The network device sends indication information to the terminal device. The indication information indicates the first weight vectors respectively corresponding to the M antenna element set groups. The first weight vectors respectively corresponding to the M antenna element set groups are used by the terminal device to send a signal on antenna elements included in the M antenna element set groups.

In the foregoing technical solution, the network device may indicate the first weight vector to the terminal device. In other words, the network device participates in a process in which the terminal device determines an analog beam. At least one antenna element set group in the M antenna element set groups includes at least two antenna element sets, and a first weight vector corresponding to each of the at least one antenna element set group includes at least two elements. Each element is corresponding to one antenna element set in each antenna element set group, and each element is used to adjust a phase of an antenna element included in the antenna element set corresponding to the element. Different elements are corresponding to different antenna element sets. For each antenna element set included in the at least one antenna element set group, the network device indicates one corresponding element by using the first weight vector. The element is used to adjust a phase of an antenna element included in an antenna element set corresponding to the element. The terminal device sends, based on the first weight vectors respectively corresponding to the M antenna element set groups, a signal on antenna elements included in the M antenna element set groups. This helps the terminal device send the signal through an analog beam that better matches a channel characteristic, improving spectrum utilization and improving communication performance.

In a possible implementation, the M antenna element set groups include a first antenna element set group, and the first antenna element set group includes at least two antenna element sets. That a network device determines first weight vectors respectively corresponding to M antenna element set groups of a terminal device includes:

The network device receives sounding reference signals sent by the terminal device on antenna elements included in the first antenna element set group by using N resources. Time domain resources respectively occupied by the N resources are different. The sounding reference signals received on the N resources are based on different second weight vectors of the first antenna element set group. The second weight vector includes at least two elements. Each of the at least two elements is corresponding to one antenna element set included in the first antenna element set, and each of the at least two elements is used to adjust a phase of an antenna element included in the antenna element set corresponding to the element. Different elements are corresponding to different antenna element sets. The network device determines, based on the sounding reference signals on the N resources, a first weight vector corresponding to the first antenna element set group.

In the foregoing implementation, the network device may obtain channel information of a higher dimension by using the sounding reference signals sent by the terminal device. The network device may determine, based on the obtained channel information, a condition that an analog beam of the terminal device should meet, and indicate the first weight vector of the first antenna element set group to the terminal device. In other words, the network device participates in a process in which the terminal device determines an analog beam. The terminal device may determine, based on the first weight vector, the analog beam that better matches the channel characteristic, and send the signal through the analog beam, to enhance energy of the signal received by the network device, improve spectrum utilization, and improve communication performance.

In another possible implementation, the time domain resources respectively occupied by the N resources are consecutive.

In this possible implementation, the N resources are consecutive in time domain, so that channel time variability in an interval between a start time domain position of a first resource in the N resources and an end time domain position of an $N^{th}$ resource may be ignored.

In another possible implementation, N is a quantity of antenna element sets included in the first antenna element set group.

In this possible implementation, the terminal device sends the sounding reference signals by using the N resources, so that the network device may obtain information about a channel between each antenna element set included in the first antenna element set group and a receive antenna or a receive channel by using the sounding reference signals.

In another possible implementation, the N resources are corresponding to N second weight vectors.

If the second weight vector is a column vector, any two row vectors in a first matrix formed by the N second weight vectors are orthogonal to each other.

Alternatively, if the second weight vector is a row vector, any two column vectors in a second matrix formed by the N second weight vectors are orthogonal to each other.

In the foregoing implementation, the sounding reference signals on the N resources meet orthogonality by using the row vector of the first matrix or the column vector of the second matrix, so that the network device obtains channel information of a higher dimension.

In another possible implementation, each row vector of the first matrix is an orthogonal code.

In the foregoing implementation, the sounding reference signals on the N resources meet orthogonality by using the orthogonal code, so that the network device obtains channel information of a higher dimension.

In another possible implementation, each column vector of the second matrix is an orthogonal code.

In the foregoing implementation, the sounding reference signals on the N resources meet orthogonality by using the orthogonal code, so that the network device obtains channel information of a higher dimension.

In another possible implementation, the orthogonal code includes any one of the following: an orthogonal cover code (OCC) code, a discrete Fourier transformation (DFT) code, or a time domain code division multiplexing (TD-CDM) code.

The foregoing implementations show a plurality of possible implementations of the orthogonal code, so that the sounding reference signals on the N resources meet orthogonality by using the orthogonal code. In the foregoing implementation, the DFT code may be used to more flexibly configure weights on different antenna element sets. For example, phase-shift values corresponding to different antenna element sets are not limited to 0 or $\pm\pi$, improving flexibility of adjusting a phase of an antenna element.

In another possible implementation, the N second weight vectors include two second weight vectors, and orthogonal codes of the two second weight vectors are respectively $[1 \ 1]^T$ and $[1 \ -1]^T$.

Alternatively, the N second weight vectors include four second weight vectors, and orthogonal codes of the four second weight vectors are respectively $[1 \ 1 \ 1 \ 1]^T$, $[1 \ 1 \ -1 \ -1]^T$, $[1 \ -1 \ 1 \ -1]^T$, and $[1 \ -1 \ -1 \ 1]^T$.

In the foregoing implementation, an example in which N is 2, the second weight vector is the column vector, and the second weight vector is the OCC code is provided, and an example in which N is 4, the second weight vector is the column vector, and the second weight vector is the OCC code is provided. This provides a possible implementation for implementing the solution, and improves implementability of the solution.

In another possible implementation, the N second weight vectors include two second weight vectors, and orthogonal codes of the two second weight vectors are respectively [1 1] and [1 −1].

Alternatively, the N second weight vectors include four second weight vectors, and orthogonal codes of the four second weight vectors are respectively [1 1 1 1], [1 1 −1 −1], [1 −1 1 −1], and [1 −1 −1 1].

In the foregoing implementation, an example in which N is 2, the second weight vector is the row vector, and the second weight vector is the OCC code is provided, and an example in which N is 4, the second weight vector is the row vector, and the second weight vector is the OCC code is provided. This provides a possible implementation for implementing the solution, and improves implementability of the solution.

In another possible implementation, the sounding reference signals sent on different resources in the N resources have different sequences.

In this possible implementation, the sounding reference signals sent on the N resources are different, enhancing randomness of the sounding reference signals. Different sequences have different performance in different channel conditions. Therefore, when the terminal device sends different sequences of the sounding reference signals on the N resources, interference to another signal may be randomized, and average channel estimation performance is achieved in different channel conditions, improving robustness or stability of the channel estimation performance in different channel conditions.

In another possible implementation, that the network device sends indication information to the terminal device includes:

The network device sends DCI to the terminal device, where the DCI indicates the first weight vector.

In this possible implementation, the network device may indicate the first weight vectors respectively corresponding to the M antenna element set groups to the terminal device by using DCI.

In another possible implementation, the DCI includes an A-TPMI, and the A-TPMI indicates a precoding matrix and the first weight vector.

In this possible implementation, the precoding matrix and the first weight vector may be indicated by using the A-TPMI. In this way, bit indication overheads of the DCI may be reduced, and bit resources consumed may be reduced.

In another possible implementation, that the network device sends indication information to the terminal device includes:

The network device sends RRC signaling or a MAC CE to the terminal device, where the RRC signaling or the MAC CE includes the indication information.

In this possible implementation, another two types of carriers of the indication information are provided, to provide a basis for implementing the solution and improve diversity of the solution.

In another possible implementation, the method further includes: The network device receives capability information from the terminal device.

The capability information includes at least one of the following: information indicating whether the terminal device supports division of antenna elements into antenna element sets, a quantity of antenna element sets supported by the terminal device, and an arrangement manner of the antenna element sets of the terminal device.

In this possible implementation, the terminal device may report the capability information to the network device, so that the network device configures an appropriate first weight vector for the terminal device, ensuring implementation of the solution.

In another possible implementation, the indication information indicates index information of the first weight vector.

Alternatively, the indication information indicates phase information of an element in the first weight vector.

Alternatively, the indication information indicates an amplitude-phase weighted value. The amplitude-phase weighted value includes a plurality of elements, and each element in the amplitude-phase weighted value is corresponding to one fourth weight vector.

In this possible implementation, a plurality of possible implementations in which the indication information indicates the first weight vector are provided, improving diversity of the solution. In addition, indication overheads of the network device may be reduced in the foregoing indication manner.

In another possible implementation, the method further includes:

The network device sends configuration information to the terminal device, where the configuration information includes time-frequency position information of the N resources and the N second weight vectors corresponding to the N resources.

In this possible implementation, the network device sends the configuration information to the terminal device, so that the terminal device may determine the N second weight vectors and related information of the N resources, so that the terminal device sends the sounding reference signals on the N resources.

A third aspect of embodiments of this disclosure provides a communication processing apparatus. The communication processing apparatus includes:

a processing module, configured to determine first weight vectors respectively corresponding to M antenna element set groups, where at least one antenna element set group in the M antenna element set groups includes at least two antenna element sets, and a first weight vector corresponding to each of the at least one antenna element set group includes at least two elements; each element is corresponding to one antenna element set in the antenna element set group, and each element is used to adjust a phase of an antenna element included in the antenna element set corresponding to the element; different elements are corresponding to different antenna element sets; and M is an integer greater than or equal to 1; and a transceiver module, configured to send, based on the first weight vectors respectively corresponding to the M antenna element set groups, a signal on antenna elements included in the M antenna element set groups.

In a possible implementation, the transceiver module is further configured to:

receive indication information from a network device, where the indication information indicates the first weight vectors respectively corresponding to the M antenna element set groups of the communication processing apparatus.

In a possible implementation, the M antenna element set groups include a first antenna element set group, and the first antenna element set group includes at least two antenna element sets.

The transceiver module is further configured to:

send sounding reference signals to the network device on antenna elements included in the first antenna element set group by using N resources, where time domain resources respectively occupied by the N resources are different, and the sounding reference signals sent on the N resources are based on different second weight vectors of the first antenna element set group; the second weight vector includes at least two elements, each of the at least two elements is corresponding to one antenna element set included in the first antenna element set, and each of the at least two elements is used to adjust a phase of an antenna element included in the antenna element set corresponding to the element; and different elements are corresponding to different antenna element sets.

In another possible implementation, the time domain resources respectively occupied by the N resources are consecutive.

In another possible implementation, N is a quantity of antenna element sets included in the first antenna element set group.

In another possible implementation, the N resources are corresponding to N second weight vectors.

If the second weight vector is a column vector, any two row vectors in a first matrix formed by the N second weight vectors are orthogonal to each other.

Alternatively, if the second weight vector is a row vector, any two column vectors in a second matrix formed by the N second weight vectors are orthogonal to each other.

In another possible implementation, each row vector of the first matrix is an orthogonal code.

In another possible implementation, each column vector of the second matrix is an orthogonal code.

In another possible implementation, the orthogonal code includes any one of the following: an OCC code, a DFT code, or a TD-CDM code.

In another possible implementation, the N second weight vectors include two second weight vectors, and orthogonal codes of the two second weight vectors are respectively $[1\ 1]^T$ and $[1\ -1]^T$.

Alternatively, the N second weight vectors include four second weight vectors, and orthogonal codes of the four second weight vectors are respectively $[1\ 1\ 1\ 1]^T$, $[1\ 1\ -1\ -1]^T$, $[1\ -1\ 1\ -1]^T$, and $[1\ -1\ -1\ 1]^T$.

In another possible implementation, the N second weight vectors include two second weight vectors, and orthogonal codes of the two second weight vectors are respectively $[1\ 1]$ and $[1\ -1]$.

Alternatively, the N second weight vectors include four second weight vectors, and orthogonal codes of the four second weight vectors are respectively $[1\ 1\ 1\ 1]$, $[1\ 1\ -1\ -1]$, $[1\ -1\ -]$, and $[1\ --1\ 1]$.

In another possible implementation, the sounding reference signals sent on different resources in the N resources have different sequences.

In another possible implementation, the transceiver module is configured to:

receive DCI from the network device, where the DCI carries indication information of the first weight vectors respectively corresponding to the M antenna element set groups.

In another possible implementation, the DCI includes an A-TPMI, and the A-TPMI indicates a precoding matrix and the first weight vector.

In another possible implementation, the transceiver module is configured to:

receive RRC signaling or a MAC CE from the network device, where the RRC signaling or the MAC CE includes the indication information.

In another possible implementation, the transceiver module is further configured to:

send capability information to the network device, where the capability information includes at least one of the following: whether the communication processing apparatus supports division of antenna elements into antenna element sets, a quantity of antenna element sets supported by the communication processing apparatus, and an arrangement manner of the antenna element sets of the communication processing apparatus.

In another possible implementation, the indication information indicates index information of the first weight vector.

The processing module is configured to: determine the first weight vector based on the index information of the first weight vector.

Alternatively, the indication information indicates phase information of an element in the first weight vector.

The processing module is configured to: determine the first weight vector based on the phase information of the element in the first weight vector.

Alternatively, the indication information indicates a plurality of amplitude-phase weighted values. The amplitude-phase weighted value includes a plurality of elements, and each element in the amplitude-phase weighted value is corresponding to one fourth weight vector.

The processing module is configured to:

determine a plurality of third weight vectors based on the amplitude-phase weighted value and a plurality of fourth weight vectors; and determine the first weight vector based on the plurality of third weight vectors.

In another possible implementation, the transceiver module is further configured to:

receive configuration information from the network device, where the configuration information includes time-frequency position information of the N resources and the N second weight vectors corresponding to the N resources.

In another possible implementation, the transceiver module is configured to:

determine a first phase-shift value based on a TCI state and an SSB index associated with the TCI state; or determine a first phase-shift value based on a TCI state and a CSI-RS resource index associated with the TCI state;

separately adjust, based on the first weight vector and the first phase-shift value, phase-shift values of the antenna elements included in the M antenna element set groups; and send the signal through the antenna elements included in the M antenna element set groups.

A fourth aspect of embodiments of this disclosure provides a communication processing apparatus. The communication processing apparatus includes:

a processing module, configured to determine first weight vectors respectively corresponding to M antenna element set groups of a terminal device, where at least one antenna element set group in the M antenna element set groups includes at least two antenna element sets, and a first weight vector corresponding to each of the at least one antenna element set group includes at least two elements; each element is corresponding to one antenna element set in the antenna element set group, and each element is used to adjust a phase of an antenna element included in the antenna element set corresponding to the element; different elements are corresponding to different antenna element sets; and M is an integer greater than or equal to 1; and a transceiver module, configured to send indication information to the terminal device, where the indication information indicates the first weight vectors respectively corresponding to the M antenna element set groups, and the first weight vectors respectively corresponding to the M antenna element set groups are used by the terminal device to send a signal on antenna elements included in the M antenna element set groups.

In a possible implementation, the M antenna element set groups include a first antenna element set group, and the first antenna element set group includes at least two antenna element sets.

The transceiver module is further configured to:

receive sounding reference signals sent by the terminal device on antenna elements included in the first antenna element set group by using N resources, where time domain resources respectively occupied by the N resources are different, and the sounding reference signals received on the N resources are based on different second weight vectors of the first antenna element set group; the second weight vector includes at least two elements, each of the at least two elements is corresponding to one antenna element set included in the first antenna element set, and each of the at least two elements is used to adjust a phase of an antenna element included in the antenna element set corresponding to the element; and different elements are corresponding to different antenna element sets.

The processing module is configured to:

determine, based on the sounding reference signals on the N resources, a first weight vector corresponding to the first antenna element set group.

In another possible implementation, the time domain resources respectively occupied by the N resources are consecutive.

In another possible implementation, N is a quantity of antenna element sets included in the first antenna element set group.

In another possible implementation, the N resources are corresponding to N second weight vectors.

If the second weight vector is a column vector, any two row vectors in a first matrix formed by the N second weight vectors are orthogonal to each other.

Alternatively, if the second weight vector is a row vector, any two column vectors in a second matrix formed by the N second weight vectors are orthogonal to each other.

In another possible implementation, each row vector of the first matrix is an orthogonal code.

In another possible implementation, each column vector of the second matrix is an orthogonal code.

In another possible implementation, the orthogonal code includes any one of the following: an OCC code, a DFT code, or a TD-CDM code.

In another possible implementation, the N second weight vectors include two second weight vectors, and orthogonal codes of the two second weight vectors are respectively $[1\ 1]^T$ and $[1\ -1]^T$.

Alternatively, the N second weight vectors include four second weight vectors, and orthogonal codes of the four second weight vectors are respectively $[1\ 1\ 1\ 1]^T$, $[1\ 1\ -1\ -1]^T$, $[1\ -1\ 1\ -1]^T$, and $[1\ -1\ -1\ 1]^T$.

In another possible implementation, the N second weight vectors include two second weight vectors, and orthogonal codes of the two second weight vectors are respectively $[1\ 1]$ and $[1\ -1]$.

Alternatively, the N second weight vectors include four second weight vectors, and orthogonal codes of the four second weight vectors are respectively $[1\ 1\ 1\ 1]$, $[1\ 1\ -1\ -1]$, $[1\ -1\ 1\ -1]$, and $[1\ -1\ -1\ 1]$.

In another possible implementation, the sounding reference signals sent on different resources in the N resources have different sequences.

In another possible implementation, the transceiver module is configured to:

send DCI to the terminal device, where the DCI carries indication information that indicates the first weight vectors respectively corresponding to the M antenna element set groups.

In another possible implementation, the DCI includes an A-TPMI, and the A-TPMI indicates a precoding matrix and the first weight vector.

In another possible implementation, the transceiver module is configured to:

send RRC signaling or a MAC CE to the terminal device, where the RRC signaling or the MAC CE includes the indication information.

In another possible implementation, the transceiver module is further configured to:

receive capability information from the terminal device.

The capability information includes at least one of the following: information indicating whether the terminal device supports division of antenna elements into antenna element sets, a quantity of antenna element sets supported by the terminal device, and an arrangement manner of the antenna element sets of the terminal device.

In another possible implementation, the indication information indicates index information of the first weight vector.

Alternatively, the indication information indicates phase information of an element in the first weight vector.

Alternatively, the indication information indicates an amplitude-phase weighted value. The amplitude-phase weighted value includes a plurality of elements, and each element in the amplitude-phase weighted value is corresponding to one fourth weight vector.

In another possible implementation, the transceiver module is further configured to:

send configuration information to the terminal device, where the configuration information includes time-frequency position information of the N resources and the N second weight vectors corresponding to the N resources.

A fifth aspect of embodiments of this disclosure provides a communication processing apparatus. The communication processing apparatus includes a processor and a memory. The memory stores a computer program, and the processor is configured to invoke and run the computer program stored in the memory, to enable the processor to implement any implementation of the first aspect.

Optionally, the communication processing apparatus further includes a transceiver, and the processor is further configured to control the transceiver to receive and send a signal.

A sixth aspect of embodiments of this disclosure provides a communication processing apparatus. The communication processing apparatus includes a processor and a memory. The memory stores a computer program, and the processor is configured to invoke and run the computer program stored in the memory, to enable the processor to implement any implementation of the second aspect.

Optionally, the communication processing apparatus further includes a transceiver, and the processor is further configured to control the transceiver to receive and send a signal.

A seventh aspect of embodiments of this disclosure provides a computer program product including instructions. When the computer program product is run on a computer, the computer is enabled to perform any one of the implementations of the first aspect or the second aspect.

An eighth aspect of embodiments of this disclosure provides a computer-readable storage medium, including computer instructions. When the computer instructions are run on a computer, the computer is enabled to perform any one of the implementations of the first aspect or the second aspect.

A ninth aspect of embodiments of this disclosure provides a chip apparatus, including a processor. The chip apparatus is configured to: be connected to a memory, and invoke a program stored in the memory, to enable the processor to perform any one of the implementations of the first aspect or the second aspect.

It can be learned from the foregoing technical solutions that embodiments of this disclosure have the following advantages.

It can be learned from the foregoing technical solutions that a terminal device determines first weight vectors respectively corresponding to M antenna element set groups. At least one antenna element set group in the M antenna element set groups includes at least two antenna element sets, and a first weight vector corresponding to each of the at least one antenna element set group includes at least two elements. Each element is corresponding to one antenna element set in the antenna element set group, and each element is used to adjust a phase of an antenna element included in the antenna element set corresponding to the element. Different elements are corresponding to different antenna element sets. M is an integer greater than or equal to 1. The terminal device sends, based on the first weight vectors respectively corresponding to the M antenna element set groups, a signal on antenna elements included in the M antenna element set groups. It can be learned that the first weight vector corresponding to each of the at least one antenna element set group includes at least two elements. Each element is corresponding to one antenna element set in the antenna element set group, and different elements are corresponding to different antenna element sets. Each antenna element set included in the at least one antenna element set group in the M antenna element set groups has a corresponding element. Each element is used to adjust the phase of the antenna element included in the antenna element set corresponding to each element. The terminal device sends, based on the first weight vectors respectively corresponding to the M antenna element set groups, a signal on antenna elements included in the M antenna element set groups. This helps the terminal device send the signal through an analog beam that better matches a channel characteristic, improving spectrum utilization and improving communication performance.

BRIEF DESCRIPTION OF DRAWINGS

FIG. 3C(1) is a schematic diagram of an antenna element set supported by a panel of a terminal device according to an embodiment of this disclosure;

FIG. 3C(2) is another schematic diagram of an antenna element set supported by a panel of a terminal device according to an embodiment of this disclosure;

FIG. 4C is a schematic diagram of effect of a communication processing method according to an embodiment of this disclosure;

FIG. 5 is a schematic diagram of another embodiment of a communication processing method according to an embodiment of this disclosure;

FIG. 6C-1 is another schematic diagram of time domain resources occupied by sounding reference signals on N resources according to an embodiment of this disclosure;

FIG. 6C-2 is another schematic diagram of time domain resources occupied by sounding reference signals on N resources according to an embodiment of this disclosure;

FIG. 6C-3 is another schematic diagram of time domain resources occupied by sounding reference signals on N resources according to an embodiment of this disclosure;

DESCRIPTION OF EMBODIMENTS

Figure 1:
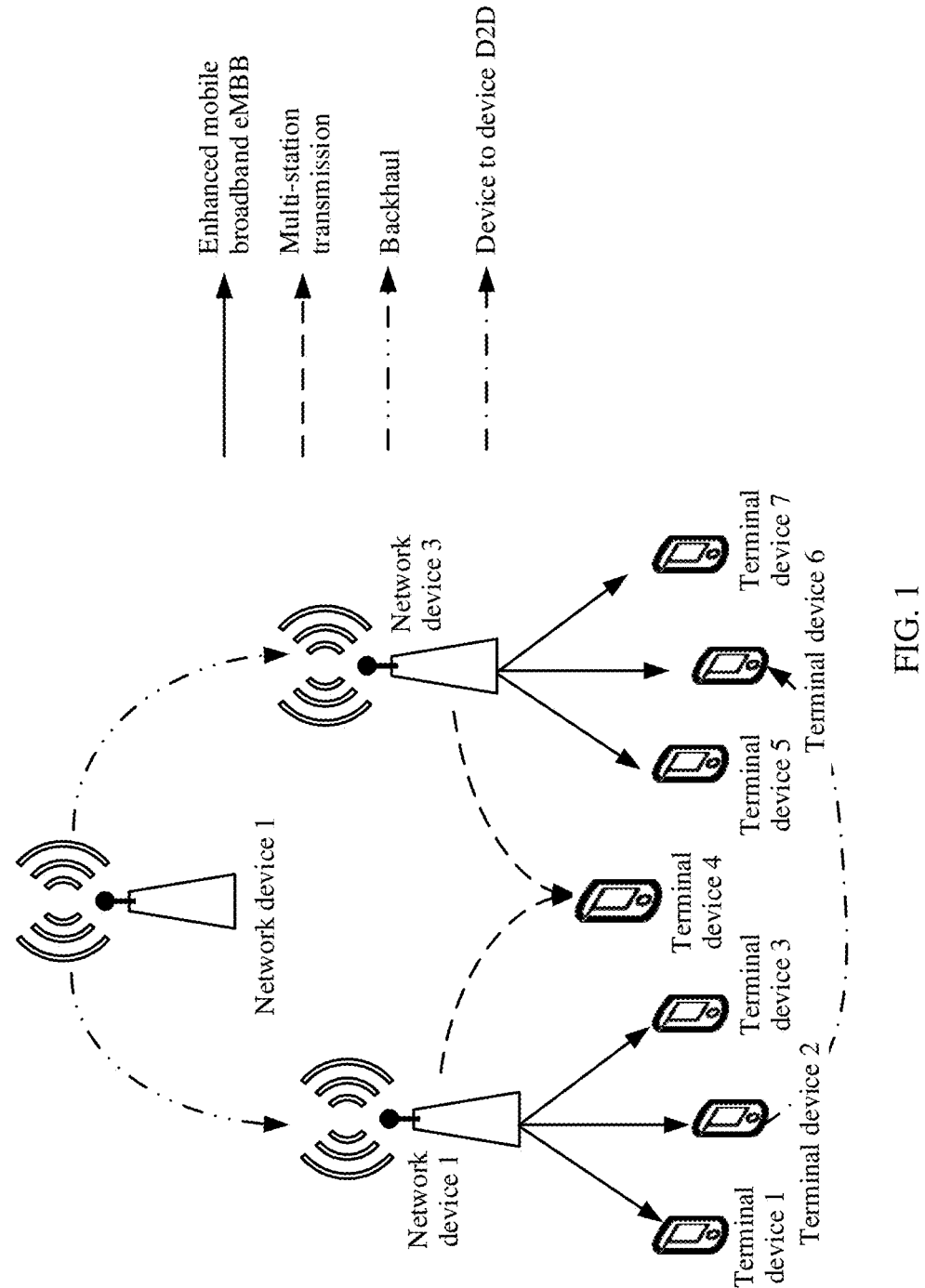
FIG. 1 is a schematic diagram of a communication system according to an embodiment of this disclosure.

Embodiments of this disclosure provide a communication processing method and a communication processing apparatus that are used by a terminal device to send a signal based on first weight vectors respectively corresponding to M antenna element set groups. This helps the terminal device send the signal through an analog beam that better matches a channel characteristic, improving spectrum utilization and improving communication performance.

A communication system to which technical solutions of this disclosure are applicable includes but is not limited to a long term evolution (LTE) system, a fifth-generation (5G) mobile communication system, a mobile communication system after a 5G network (for example, a 6G mobile communication system), a device to device (D2D) communication system, an internet of vehicles (vehicle to everything, V2X) communication system, a system integrating a plurality of communication systems, a new radio (NR) system, or a non-terrestrial communication network (non-terrestrial network, NTN) system.

The communication system to which this disclosure is applicable includes a network device and a terminal device, and a communication connection is established between the network device and the terminal device.

The terminal device may be a wireless terminal device that can receive scheduling and indication information from the network device. The wireless terminal device may be a device that provides voice and/or data connectivity for a user, a handheld device having a wireless connection function, or another processing device connected to a wireless modem.

The terminal device, also referred to as user equipment (UE), a mobile station (MS), a mobile terminal (MT), or the like, is a device including a wireless communication function (providing voice/data connectivity to a user), for example, a handheld device having a wireless connection function, a vehicle-mounted device, or the like. Currently, some examples of the terminal device are a mobile phone, a tablet computer, a laptop computer, a palmtop computer, a mobile Internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, and the like.

The network device may be a device in a wireless network. For example, the network device may be a radio access network (RAN) node that connects the terminal device to the wireless network, and may also be referred to as an access network device.

The access network device may be an apparatus deployed in a radio access network for providing the wireless communication function for the terminal device. The access network device is a base station, and the base station is a macro base station, a micro base station (also referred to as a small cell), a relay station, an access point (AP), a wearable device, a vehicle-mounted device, or the like in various forms. The base station may also be a transmission and reception point (TRP), a transmission measurement function (TMF), or the like. For example, a base station in embodiments of this disclosure may be a base station in new radio (NR). A base station in the 5G NR may also be referred to as a transmission reception point (TRP), a transmission point (TP), a next generation NodeB (ngNB), or an evolved NodeB (evolutional NodeB, eNB or eNodeB) in the long term evolution (LTE) system.

The following describes some possible scenarios to which the technical solutions of this disclosure are applicable.

FIG. 1 is a schematic diagram of a communication system according to an embodiment of this disclosure. Refer to FIG. 1, the communication system includes at least one network device and at least one terminal device. As shown in FIG. 1, a scenario to which this disclosure is applicable includes but is not limited to a scenario that has a high requirement for timing or a high requirement for a transmission rate, for example, multi-station transmission, backhaul, wireless to the x (WTTx), enhanced mobile broadband (eMBB), D2D, or the like. The multi-station transmission includes that a same terminal device simultaneously transmits signals to a plurality of transmission points (the transmission points may be the network device shown in FIG. 1).

It should be noted that the communication system to which this disclosure is applicable is not limited to a system based on cyclic prefix-orthogonal frequency division multiplexing (CP-OFDM) or discrete Fourier transformation-spread-orthogonal frequency division multiplexing (DFT-spread-OFDM, DFT-s-OFDM).

The following describes the technical solutions of this disclosure with reference to specific embodiments.

Figure 2:
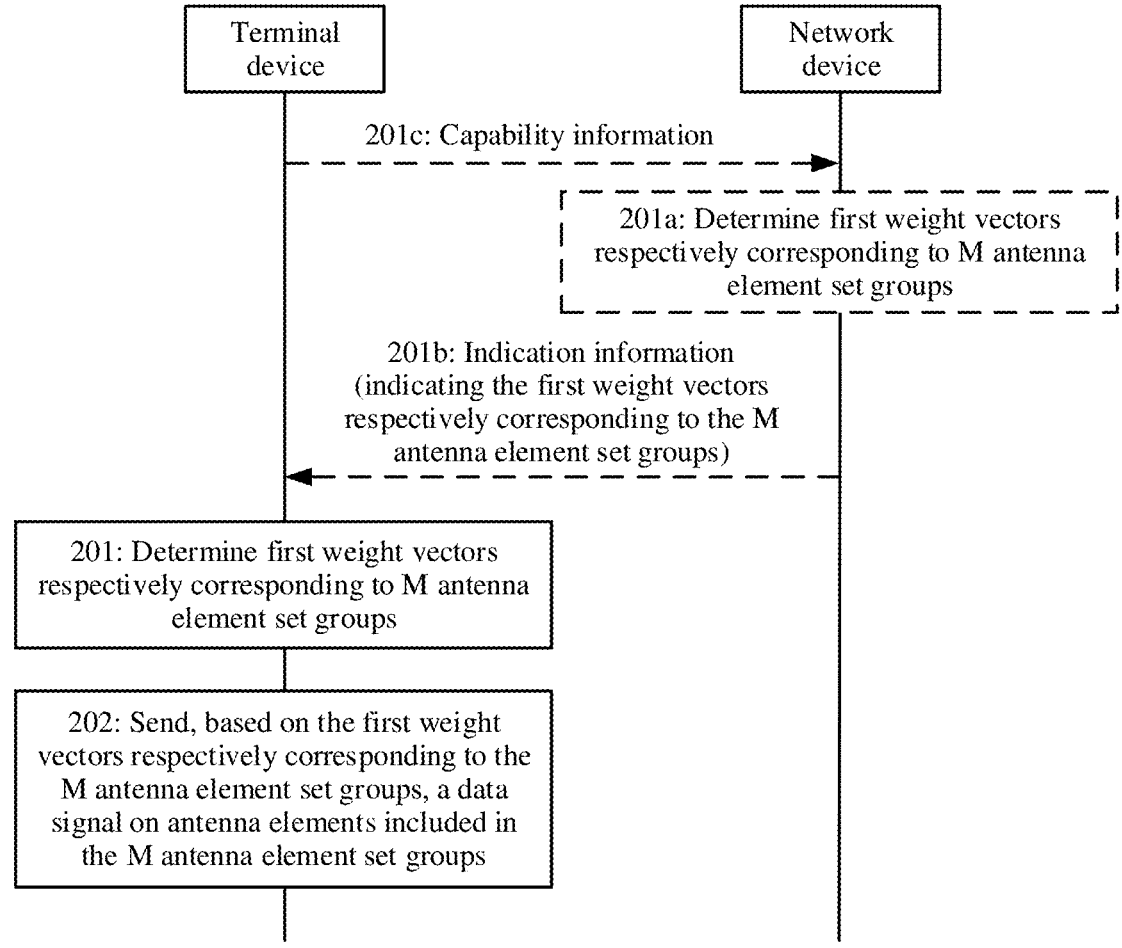
FIG. 2 is a schematic diagram of an embodiment of a communication processing method according to an embodiment of this disclosure.

FIG. 2 is a schematic diagram of an embodiment of a communication processing method according to an embodiment of this disclosure. Refer to FIG. 2. The communication processing method includes the following steps.

201: A terminal device determines first weight vectors respectively corresponding to M antenna element set groups.

At least one antenna element set group in the M antenna element set groups includes at least two antenna element sets. A first weight vector corresponding to each of the at least one antenna element set group includes at least two elements. Each element is corresponding to one antenna element set in the antenna element set group, and each element is used to adjust a phase of an antenna element included in the antenna element set corresponding to the element. Different elements are corresponding to different antenna element sets. M is an integer greater than or equal to 1.

In some implementations, the M antenna element set groups of the terminal device may be obtained through division based on antenna ports or digital channels of the terminal device. Antenna elements corresponding to or mapped to one antenna port or one digital channel may be considered as antenna elements included in a same antenna element set group. Optionally, one antenna element set group is corresponding to one antenna port, or one transmit channel is corresponding to one antenna element set group. Optionally, a first weight vector corresponding to one antenna element set group may also be referred to as a first weight vector corresponding to one antenna port. In an example, based on a definition of an existing communication protocol, a signal transmitted on the antenna port or a signal transmitted on the digital channel may be defined as a signal using a same precoding codebook, or may be defined as a digital channel or a transmit link on which a precoded signal is located.

Figure 3A:
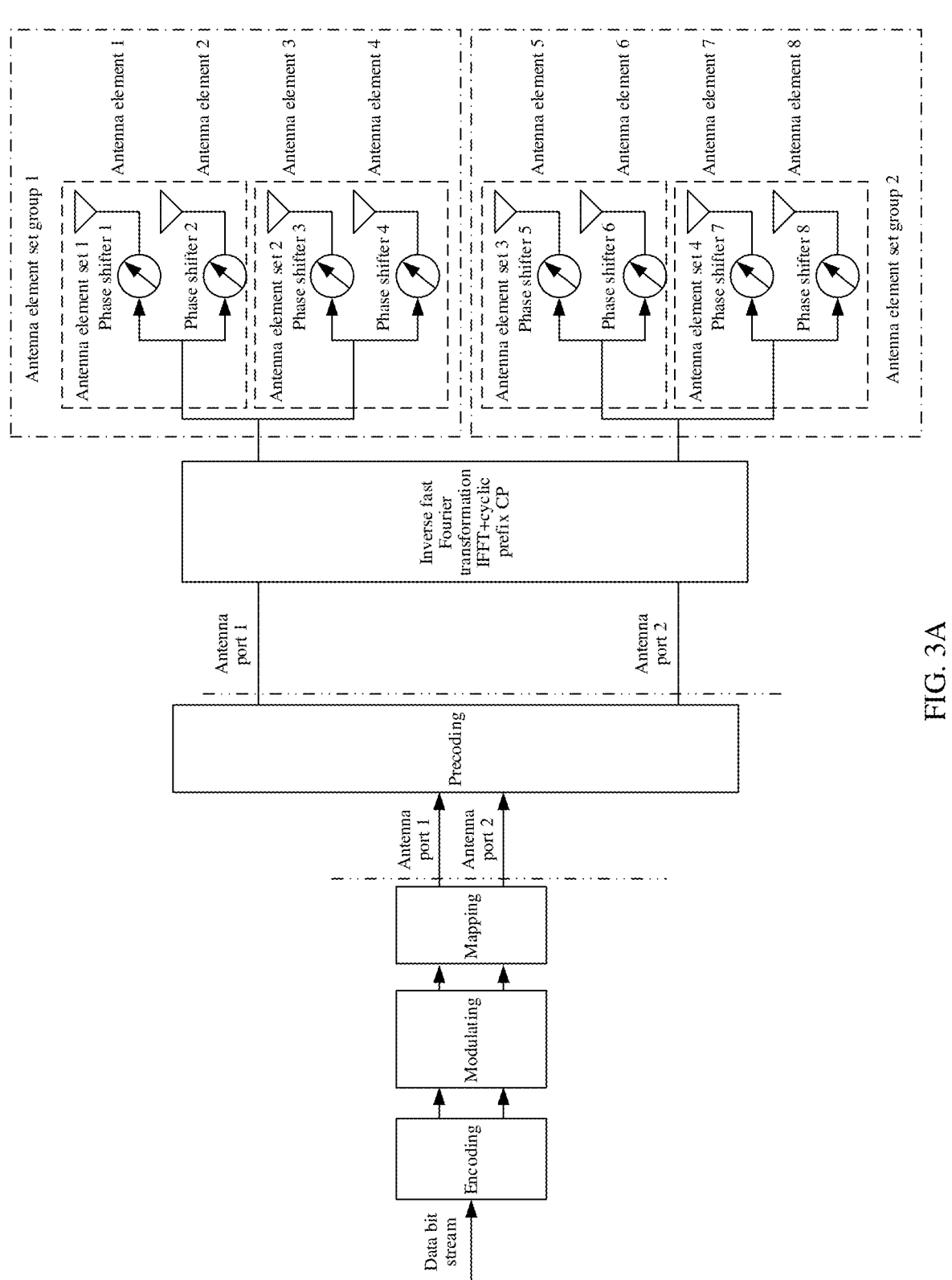
FIG. 3A is a schematic diagram of a scenario of a communication processing method according to an embodiment of this disclosure.

For example, as shown in FIG. 3A, the terminal device encodes a data bit stream to obtain a first signal, and then performs modulation and resource mapping on the first signal to obtain a second signal. Then, the terminal device performs precoding processing, inverse fast Fourier transformation (IFFT) processing, and cyclic prefix (CP) processing on the second signal to obtain a third signal. The terminal device sends the third signal by using the first weight vector corresponding to each antenna element set group. Antenna ports of the terminal device include an antenna port 1 and an antenna port 2. Signals of the antenna port 1 and the antenna port 2 may be a signal before precoding or a signal after precoding shown in FIG. 3A. Antenna elements 1 to 4 connected to the antenna port 1 belong to an antenna element set group 1. Antenna elements 5 to 8 connected to the antenna port 2 belong to an antenna element set group 2.

It should be noted that the example shown in FIG. 3A merely shows a case in which the terminal device includes two antenna ports. During actual application, the terminal device includes at least one antenna port. This is not limited in this disclosure.

At least one antenna element set group in the M antenna element set groups includes at least two antenna element sets. One antenna element set may be represented as a virtual port. Therefore, the antenna element set in this application may also be replaced with the virtual port.

For example, as shown in FIG. 3A, the antenna element set group 1 includes an antenna element set 1 and an antenna element set 2. The antenna element set 1 includes an antenna element 1 and an antenna element 2. The antenna element set 2 includes an antenna element 3 and an antenna element 4. It can be learned that a first weight vector corresponding to the antenna element set group 1 includes two elements: an element 1 and an element 2. The element 1 is corresponding to the antenna element set 1. In other words, the element 1 is used to adjust a phase of an antenna element included in the antenna element set 1. The terminal device may adjust, by using the element 1, a phase-shift value of a phase shifter 1 connected to the antenna element 1 and a phase-shift value of a phase shifter 2 connected to the antenna element set 2, to adjust the phases of the antenna elements included in the antenna element set 1. The element 2 is corresponding to the antenna element set 2. In other words, the element 2 is used to adjust a phase of an antenna element included in the antenna element set 2. The terminal device may adjust, by using the element 2, a phase-shift value of a phase shifter 3 connected to the antenna element 3 and a phase-shift value of the phase shifter 4 connected to the antenna element 4.

FIG. 3A shows an example in which each of the M antenna element set groups of the terminal device includes at least two antenna element sets. During actual application, at least one antenna element set group in the M antenna element set groups of the terminal device includes at least two antenna element sets. This is not limited in this disclosure. The example in FIG. 3A does not form a limitation on this disclosure.

FIG. 3A shows an example in which each antenna element set group includes two antenna element sets, and each antenna element set includes two antenna elements. During actual application, each antenna element set group includes at least two antenna element sets, and each antenna element set includes at least one antenna element. This is not limited in this disclosure. The example in FIG. 3A does not form a limitation on this disclosure.

In the example in FIG. 3A, each antenna element is independently connected to a phase shifter. During actual application, an antenna element included in a same antenna element set may be connected to a same phase shifter, provided that a phase of the antenna element included in the antenna element set can be controlled by using the phase shifter. This is not limited in this disclosure. The example in FIG. 3A does not form a limitation on this disclosure.

In some implementations, different antenna element sets include same antenna elements, or different antenna element sets include antenna elements that are partially or all different.

For example, as shown in FIG. 3A, the antenna element set 1 includes the antenna element 1 and the antenna element 2. The antenna element set 2 includes the antenna element 3 and the antenna element 4. Therefore, it can be learned that antenna elements included in the antenna element set 1 and the antenna element set 2 are all different.

Figure 3B:
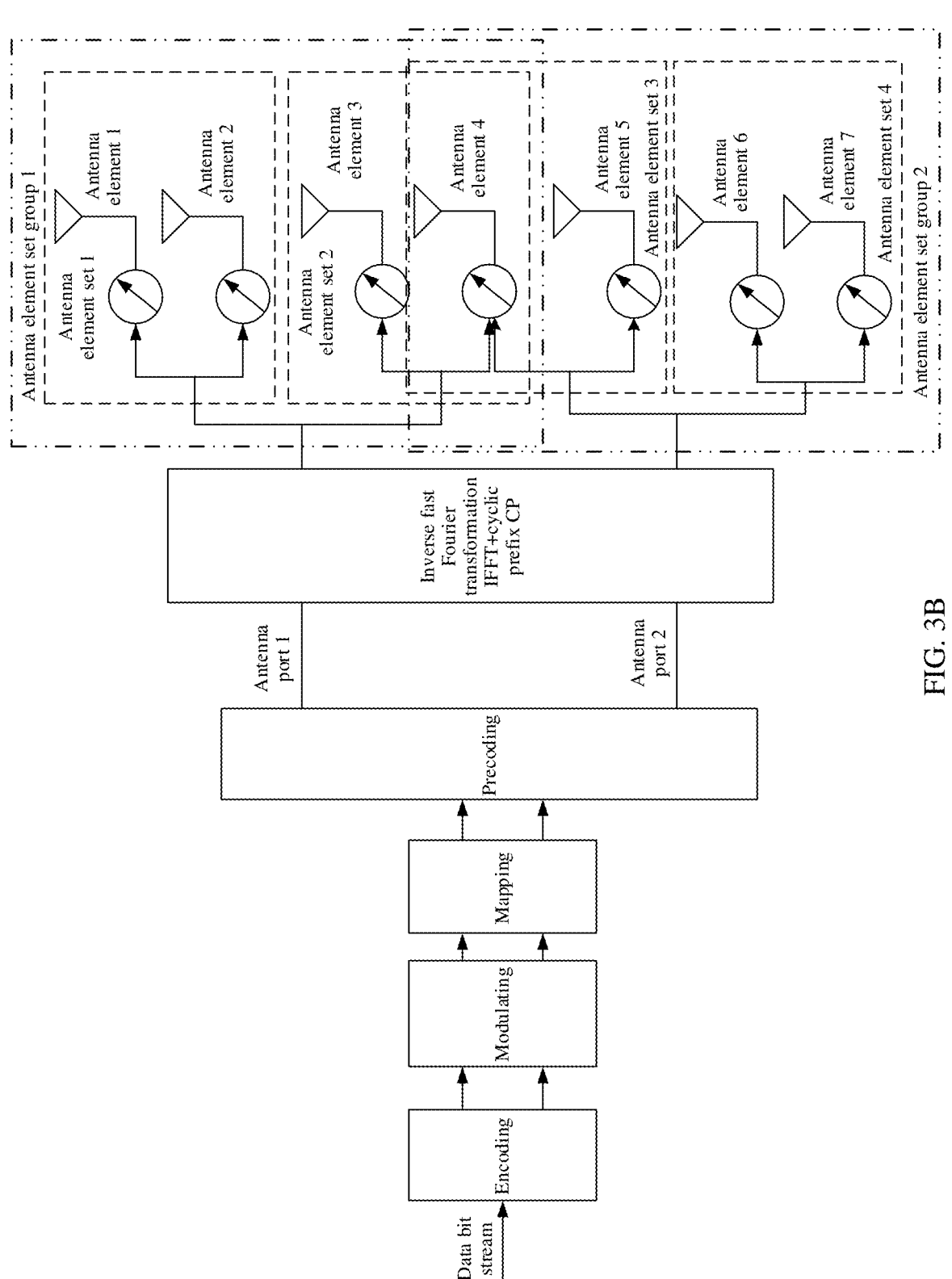
FIG. 3B is a schematic diagram of a scenario of a communication processing method according to an embodiment of this disclosure.

For example, as shown in FIG. 3B, an antenna element set group 1 includes an antenna element set 1 and an antenna element set 2. An antenna element set group 2 includes an antenna element set 3 and an antenna element set 4. The antenna element set 1 includes an antenna element 1 and an antenna element 2. The antenna element set 2 includes an antenna element 3 and an antenna element 4. The antenna element set 3 includes the antenna element 4 and an antenna element 5. The antenna element set 4 includes an antenna element 6 and an antenna element 7. It can be learned that the antenna element set 1 and the antenna element set 3 include some same antenna elements.

In step 201, optionally, each element included in the first weight vector is a complex number whose amplitude is 1. Each element is used to adjust or determine a phase of an antenna element included in a corresponding antenna element set, and may be implemented by adjusting a phase-shift value of a phase shifter of the antenna element in the antenna element set.

In some implementations, the first weight vector may be an orthogonal code, such as an OCC code, a DFT code, or a TD-CDM code. This is not limited in this disclosure. The OCC code may be from an OCC codebook, the DFT code may be from a DFT codebook, and the TC-CDM code may be from a TD-CDM codebook, or may be from a codebook in a specified or predefined codebook set.

For more descriptions of a form of the first weight vector, refer to the related descriptions of the embodiment shown in FIG. 5 below.

In some implementations, first weight vectors corresponding to different antenna element set groups may be the same or may be different.

For example, as shown in FIG. 3A, the antenna element set group 1 includes two antenna element sets, and the antenna element set group 2 includes two antenna element sets. A first weight vector corresponding to the antenna element set group 1 may be the same as or different from a first weight vector corresponding to the antenna element set group 2. Therefore, first weight vectors corresponding to two different antenna element set groups that include a same quantity of antenna element sets may be the same or may be different.

Optionally, the embodiment shown in FIG. 2 further includes step 201a and step 201b. Step 201a and step 201b may be performed before step 201.

201a: A network device determines first weight vectors respectively corresponding to M antenna element set groups.

For related descriptions of the first weight vectors respectively corresponding to the M antenna element set groups, refer to the related descriptions of step 201.

In some implementations, the network device may determine, based on sounding reference signals sent by the terminal device, the first weight vectors respectively corresponding to the M antenna element set groups. For a detailed process, refer to descriptions of the embodiment shown in FIG. 5.

201*b*: The network device sends indication information to the terminal device. Correspondingly, the terminal device receives the indication information from the network device.

The indication information indicates the first weight vectors respectively corresponding to the M antenna element set groups.

In some implementations, the network device may indicate elements included in the first weight vectors corresponding to the M antenna element set groups by using one or more vectors. For example, for each antenna element set, the network device indicates one corresponding first weight vector. Alternatively, for the M antenna element sets, the network device indicates one vector, and the vector includes the elements included in the first weight vectors corresponding to the M antenna element set groups.

In some implementations, the network device may send the indication information to the terminal device by using control signaling. For example, first control signaling includes downlink control information (DCI), radio resource control (RRC) signaling, or a media access control control element (MAC CE).

Optionally, the indication information may be located in a sounding reference signal resource (SRS resource) indication field and/or a transmit precoding matrix indication (TPMI) field in first DCI.

The following describes several possible implementations in which the network device indicates the first weight vector by using the first DCI. Another implementation is still applicable to this disclosure. This is not limited in this disclosure.

Implementation 1: The first DCI includes a TPMI and an analog transmit precoding matrix indication (A-TPMI). The TPMI indicates a precoding matrix of the antenna port, and the A-TPMI indicates the first weight vector.

The precoding matrix is used to generate a signal of the antenna port. The network device indicates the precoding matrix to the terminal device by using the TPMI. An indication manner may be similar to an existing procedure.

For example, bits that are in the first DCI and that are used to indicate the precoding matrix and the first weight vector include 10 bits, where first five bits indicate the precoding matrix, and last five bits indicate the first weight vector.

Implementation 2: The first DCI includes an A-TPMI, and the A-TPMI indicates a precoding matrix and the first weight vector.

For example, a codebook corresponding to the precoding matrix is $$\frac{1}{\sqrt{2}}\begin{bmatrix}1\\-1\end{bmatrix},$$

and a codebook corresponding to the first weight vector is $$\frac{1}{\sqrt{2}}\begin{bmatrix}1\\j\end{bmatrix}.$$

A joint codebook of the codebook corresponding to the precoding matrix and the codebook corresponding to the first weight vector may be represented as

22

$$\frac{1}{\sqrt{2}}\begin{bmatrix}1*\frac{1}{\sqrt{2}}\begin{bmatrix}1\\j\end{bmatrix}\\-1*\frac{1}{\sqrt{2}}\begin{bmatrix}1\\j\end{bmatrix}\end{bmatrix}=\frac{1}{2}\begin{bmatrix}1\\j\\-1\\-j\end{bmatrix}.$$

The network device indicates the joint codebook by using the A-TPMI. For example, if an index of the joint codebook is 1, the network device indicates the index by using the A-TPMI. The terminal device determines the joint codebook by using the index, and parses the joint codebook to obtain the codebook corresponding to the precoding matrix and the codebook corresponding to the first weight vector. For example, the terminal device determines, by using $$\frac{1}{2}\begin{bmatrix}1\\j\\-1\\-j\end{bmatrix},$$

a common factor vector $$\frac{1}{\sqrt{2}}\begin{bmatrix}1\\j\end{bmatrix}$$

of first two rows (corresponding to the antenna element set 1) and last two rows (corresponding to the antenna element set 2). Both the first two rows and the last two rows may be represented in a form of multiplying the common factor vector by a complex number. For the joint codebook to find a common factor vector between sets, a row in the joint codebook corresponding to each set may be first determined based on division information of the antenna element sets. It can be learned that a relationship between the first two rows and the common factor vector is:

$$\frac{1}{\sqrt{2}}\begin{bmatrix}1\\j\end{bmatrix}*\frac{1}{\sqrt{2}}=\frac{1}{2}\begin{bmatrix}1\\j\end{bmatrix},$$

and a relationship between the last two rows and the common factor vector is:

$$\frac{1}{\sqrt{2}}\begin{bmatrix}1\\j\end{bmatrix}*-\frac{1}{\sqrt{2}}=\frac{1}{2}\begin{bmatrix}-1\\-j\end{bmatrix}\cdot\frac{1}{2}\begin{bmatrix}1\\j\end{bmatrix}$$

is a vector formed by the first two rows in $$\frac{1}{2}\begin{bmatrix}1\\j\\-1\\-j\end{bmatrix}\cdot\frac{1}{2}\begin{bmatrix}-1\\-j\end{bmatrix}$$

is a vector formed by the last two rows in $$\frac{1}{2}\begin{bmatrix}1\\j\\-1\\-j\end{bmatrix}.$$

The terminal device may combine multiplication factors of relationships between the common factor vector and each of elements in the first two rows and elements in the last two rows in the joint codebook, to obtain a codebook of the precoding matrix, that is, to combine $$\frac{1}{\sqrt{2}} \text{ and } -\frac{1}{\sqrt{2}}$$

into $$\frac{1}{\sqrt{2}}\begin{bmatrix} 1 \\ -1 \end{bmatrix}.$$

Therefore, the terminal device may obtain the codebook $$\frac{1}{\sqrt{2}}\begin{bmatrix} 1 \\ -1 \end{bmatrix}$$

corresponding to the precoding matrix and the codebook $$\frac{1}{\sqrt{2}}\begin{bmatrix} 1 \\ j \end{bmatrix}$$

corresponding to the first weight vector.

For a manner in which the network device indicates the first weight vector to the terminal device by using the first DCI, possible implementations of an effective time of the first weight vector and effective duration of the first weight vector are described.

In some implementations, for the manner in which the network device indicates the first weight vector by using the first DCI, an interval between an effective start time domain position of the first weight vector and a time domain position at which the network device sends the first DCI is a first interval.

After the terminal device receives the first weight vector, the terminal device may adjust or control, based on the first weight vector, a phase of an antenna element in the M antenna element set groups. The terminal device may adjust a phase-shift value of a phase shifter connected to the antenna element. Therefore, the network device needs to reserve a specific time to ensure that the terminal device can adjust, in a timely manner, the phase-shift value of the phase shifter connected to the antenna element. Therefore, the interval between the effective start time domain position of the first weight vector and the time domain position at which the network device sends the first DCI may be the first interval. In other words, within duration of the first interval, the terminal device completes adjustment of the phase-shift value of the phase shifter connected to the antenna element. For example, the first interval is 2, and a unit of the first interval is a time domain symbol, a slot, or another time unit. This is not limited in this disclosure.

The first interval may be predefined, or is determined by the network device based on capability information of the terminal device and notified to the terminal device, or is reported by the terminal device, or is an interval determined by the network device or the terminal device in different predefined conditions. This is not limited in this disclosure.

In some implementations, for the manner in which the network device indicates the first weight vector by using the first DCI, the first weight vector takes effect on a physical uplink shared channel (PUSCH) scheduled by the network device by using the first DCI. In other words, the terminal device transmits the PUSCH by using the first weight vector.

In this case, the first weight vector may take effect only on the PUSCH scheduled by using the first DCI. A first weight vector that takes effect on a PUSCH scheduled by the network device by using another DCI may be a first weight vector indicated by the another DCI.

Optionally, the network device schedules the terminal device to send an SRS at the same time by using the DCI, and then the first weight vector also takes effect on the SRS. In other words, the terminal device sends the SRS by using the first weight vector. For a process in which the terminal device sends the SRS, refer to the related descriptions of the embodiment shown in FIG. 5 below.

For the manner in which the network device indicates the first weight vector by using the first DCI, the network device may update the first weight vector in a timely manner based on a channel variation characteristic, and indicate an updated first weight vector to the terminal device by using the first DCI. In this case, an update frequency of the first weight vector is high, and the network device may indicate a first weight vector that matches the channel variation characteristic to the terminal device in a timely manner based on the channel variation characteristic, improving communication performance.

For a manner in which the network device indicates the first weight vector to the terminal device by using RRC signaling, possible implementations of an effective time of the first weight vector and effective duration of the first weight vector are described.

In some implementations, the network device indicates the first weight vector to the terminal device periodically or in a trigger manner by using the RRC signaling. For the manner in which the network device indicates the first weight vector by using the RRC signaling, the first weight vector may take effect on a plurality of PUSCHs scheduled by using a plurality of pieces of DCI. In other words, the terminal device transmits, by using the first weight vector, the PUSCHs scheduled by using the plurality of pieces of DCI. Optionally, the plurality of pieces of DCI are further used to schedule an SRS, and the terminal device sends the SRS by using the first weight vector. For a process in which the terminal device sends the SRS, refer to the related descriptions in FIG. 5 below.

For the manner in which the network device indicates the first weight vector by using the RRC signaling, the effective time of the first weight vector is long.

In some implementations, for the manner in which the network device indicates the first weight vector by using the RRC signaling, an interval between an effective start time domain position of the first weight vector and a time domain position at which the network device sends the RRC signaling is a first interval. For related descriptions of the first interval, refer to the foregoing related descriptions.

The following describes two possible implementations of the effective duration that is of the first weight vector and that is indicated by the network device by using the RRC signaling.

Implementation 1: The effective duration of the first weight vector is a time between the effective start time domain position of the first weight vector and a time domain position at which the network device sends next RRC signaling (indicating an updated first weight vector).

Implementation 2: The effective duration of the first weight vector is a time between the effective start time domain position of the first weight vector and an effective start time domain position of a downlink receive weight of the terminal device.

For example, it is assumed that an effective start time of a first weight vector w1 indicated by the network device by using the RRC signaling is t1, a time corresponding to the time domain position at which the network device sends the next RRC signaling (indicating the updated first weight vector) is t2, and an effective start time of the downlink receive weight of the terminal device is t3, and t3<t2. In this case, the effective time of the first weight vector w1 is a time between t1 and t3.

For the manner in which the network device indicates the first weight vector by using the RRC signaling, an update frequency of the first weight vector is low, and the effective duration of the first weight vector is long. The network device does not need to frequently indicate the first weight vector, so that signaling overheads are reduced. In addition, the update frequency of the first weight vector is low, and an update frequency of a phase of the antenna element is low. Therefore, signaling overheads may be reduced, and power consumption needed by the terminal device to update the phase-shift value may be further reduced.

In some implementations, for different channels or different reference signals, the network device may indicate the first weight vector by using different control signaling.

For example, the network device may indicate a first weight vector used to transmit the PUSCH by using the DCI. The network device may indicate a first weight vector used to transmit the PUCCH and/or the SRS by using the RRC signaling.

Based on step 201$a$ and step 201$b$, step 201 includes: The terminal device determines, based on the indication information, the first weight vectors respectively corresponding to the M antenna element set groups.

The following describes several possible implementations in which the terminal device indicates the first weight vectors corresponding to the M antenna element set groups by using the indication information. Another implementation is still applicable to this disclosure. This is not limited in this disclosure.

Implementation 1: The indication information indicates index information of the first weight vector.

Based on the implementation 1, step 201 includes: The terminal device determines, based on the index information of the first weight vector, the first weight vectors respectively corresponding to the M antenna element set groups.

For example, a quantity of antenna element sets supported by the terminal device is R, and R=N1*N2. For example, on a panel of the terminal device, a horizontal direction includes N2 antenna element set bases, and a vertical direction includes N1 antenna element set bases. Therefore, the quantity of antenna element sets supported by the terminal device is R. To be specific, the M antenna element set groups include R antenna element sets. The indication information includes a first vector index value p and a second vector index value q. The first vector index value p indicates a first vector, and the second vector index value q indicates a second vector. The second vector includes elements included in the first weight vectors corresponding to the M antenna element set groups. The terminal device determines the first vector $u_p$ based on the first vector index value. The terminal device determines the second vector $v_{q,p}$ based on the first vector $u_p$ and the second vector index value q.

The first vector satisfies $$u_p = \begin{cases} \left[ 1, e^{j\frac{2\pi p}{O_2 N_2}}, \dots e^{j\frac{2\pi p(N_2-1)}{O_2 N_2}} \right] & N_2 > 1 \\ 1 & N_2 = 1 \end{cases}.$$

$O_1$ and $O_2$ are sampling factors configured by the network device. The second vector satisfies $$v_{q,p} = \left[ u_p, e^{j\frac{2\pi q}{O_1 N_1}} u_p \dots e^{j\frac{2\pi q(N_1-1)}{O_1 N_1}} u_p \right]^T,$$

where $[Q]^T$ represents performing a transposition operation on "Q". The second vector $v_{q,p}$ includes R elements, and R=N1*N2. The R elements are the elements included in the first weight vectors corresponding to the M antenna element set groups. In other words, the R elements are respectively weights of the R antenna element sets. Specifically, the R elements may be phase-shift values respectively corresponding to the R antenna element sets, and are used to adjust phases of antenna elements included in the antenna element sets.

Implementation 2: The indication information indicates phase information of the first weight vector. Each element of the first weight vector is a phase value. The phase information of the first weight vector includes the phase value in the first weight vector.

Based on the implementation 2, step 201 includes: The terminal device determines, based on the phase information of the first weight vector, the first weight vectors respectively corresponding to the M antenna element set groups.

For example, a quantity of antenna element sets supported by the terminal device is R, and R=N1*N2. On a panel of the terminal device, a horizontal direction includes N2 antenna element set bases, and a vertical direction includes N1 antenna element set bases. Therefore, the quantity of antenna element sets supported by the terminal device is R. The indication information indicates R phase values. The terminal device determines that the R phase values are phases of antenna elements included in the R antenna element sets. The R phase values are phase values that are closest to R actual phase values, and the R actual phase values are phase values determined by the network device for the terminal device. To facilitate indication and reduce indication overheads, R phase values that are respectively close to the R actual phase values may be selected. For example, if the actual phase value is 89 degrees, the network device may indicate a phase value $\pi/2$ that is close to 89 degrees to the terminal device. For example, each phase value is indicated by using B bits, a bit "00" is corresponding to a phase 0, a bit "01" is corresponding to a phase $\pi/2$, a bit "10" is corresponding to a phase $\pi$, and a bit "11" is corresponding to a phase $-\pi/2$. Correspondences between the bits and the phases are merely an example. Alternatively, the indication information indicates S phase values, and an indication manner of the S phase values is similar to an indication manner of the R phase values. S is an integer less than or equal to R, and the S phase values are respectively used to adjust phases of antenna elements included in corresponding antenna element sets. For another antenna element set that is not indicated, a phase value of the antenna element set is 0 by default.

Implementation 3: The indication information indicates an amplitude-phase weighted value.

The amplitude-phase weighted value includes a plurality of elements, each element is corresponding to one fourth weight vector, and represents a weighted value of the fourth weight vector. Different elements are corresponding to different fourth weight vectors. Each element in the amplitude-phase weighted value includes an amplitude weighted value and a phase weighted value, and is used to adjust a fourth weight vector corresponding to the element. In other words, the plurality of elements included in the amplitude-phase weighted value are corresponding to a plurality of fourth weight vectors.

The plurality of fourth weight vectors may be indicated by the network device to the terminal device, or may be agreed upon in advance. The plurality of fourth weight vectors may be indicated by using the indication information, or may be indicated by using other indication information. This is not limited in this disclosure.

For example, a plurality of weight vectors are preconfigured in the terminal device, and the network device indicates, to the terminal device, some of the plurality of weight vectors as the plurality of fourth weight vectors. A specific indication manner may be similar to an indication manner in the implementation 1. For example, a plurality of DFT codebooks or a plurality of OCC codebooks are preconfigured for the terminal device, and the network device indicates, to the terminal device, some DFT codes in the plurality of DFT codebooks or some OCC codes in the plurality of OCC codebooks as the plurality of fourth weight vectors.

For example, the plurality of fourth weight vectors may alternatively be weight vectors used by the terminal device to send an SRS on antenna elements included in the M antenna element set groups. For details about the weight vectors used by the terminal device to send the SRS, refer to the related descriptions of the embodiment shown in FIG. 5 below.

Based on the implementation 3, step 201 includes step 2001 and step 2002.

Step 2001: The terminal device determines a plurality of third weight vectors based on the amplitude-phase weighted value and the plurality of fourth weight vectors.

Example 1: The plurality of fourth weight vectors are respectively w1, w2, w3, and w4. wi is a vector including N1*N2 elements, and i is an integer greater than or equal to 1 and less than or equal to 4. The amplitude-phase weighted values are {c1, c2, c3, c4}. ci is a scalar, and a value is a complex number. Therefore, the terminal device may obtain four third weight vectors: c1*w1, c2*w2, c3*w3, and c4*w4.

Optionally, c1 may be 1 by default. In this case, the indication information in the foregoing implementation 3 may indicate c2, c3, and c4.

Example 2: In the examples shown in FIG. 6A and FIG. 6B, an antenna element set group 1 includes an antenna element set 1 and an antenna element set 2. Two fourth weight vectors used by the terminal device to send the SRS on the antenna element set group 1 are respectively $[1\ 1]^T$ and $[1\ -1]^T$. The amplitude-phase weighted value includes two elements. In a first element, the amplitude weighted value is 1, and the phase weighted value is 0. In a second element, the amplitude weighted value is a, and the phase weighted value is exp(1j*b). In this case, the fourth weight vector $[1\ 1]^T$ is corresponding to the first element, and the fourth weight vector $[1\ -1]^T$ is corresponding to the second element. In this case, the terminal device may obtain two third weight vectors $[1\ 1]^T$ and $[a*exp(1j*b)\ -a*exp(1j*b)]^T$.

It should be noted that in Example 2, the amplitude weighted value in the amplitude-phase weighted value may be replaced with power information of the sounding reference signals. The network device may further deliver the power information of the sounding reference signals by using power result information. In other words, each element in the amplitude-phase weighted value may include the phase weighted value, but does not include the amplitude weighted value.

Step 2002: The terminal device determines the first weight vector based on the plurality of third weight vectors.

For example, with reference to Example 1 of step 203a, the first weight vector is (c1*w1+c2*w2+c3*w3+c4*w4)./abs(c1*w1+c2*w2+c3*w3+c4*w4). indicates that a modulo operation is performed on "Y", and indicates that a modulo operation is performed on each element in Y when Y is a vector or a matrix. "./" indicates that a division operation is performed on elements at a same position in the vector, that is, [a b]./abs([a b]) indicates [a/abs(a) b/abs(b)]. Optionally, c1 may be 1 by default.

For example, with reference to Example 2 of step 203a, the first weight vector is phase([1+a*exp(1j*b) 1−a*exp(1j*b)]$^T$), and phase(z) indicates that a phase is taken on z, or the first weight vector is [1+a*exp(1j*b) 1−a*exp(1j*b)]$^T$./[abs(1+a*exp(1j*b)) abs(1−a*exp(1j*b))]$^T$.

Optionally, the embodiment shown in FIG. 2 further includes step 201c. Step 201a may be performed before step 201.

Step 201a: The terminal device sends capability information to the network device. Correspondingly, the network device receives the capability information from the terminal device.

The capability information includes at least one of the following: information indicating whether the terminal device supports division of antenna elements into antenna element sets, a quantity of antenna element sets supported by the terminal device, and an arrangement manner of the antenna element sets supported by the terminal device.

The following separately describes content included in the capability information.

1. Information indicating whether the terminal device supports division of the antenna elements into the antenna element sets.

Figure 4A:
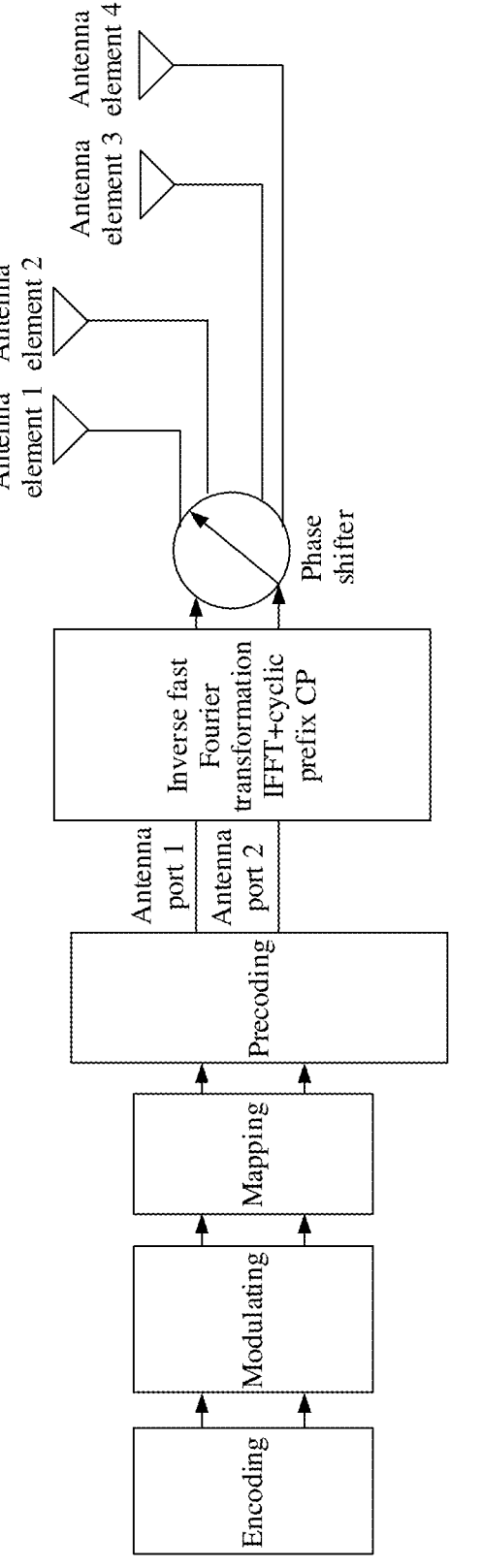
FIG. 4A is a schematic diagram of another scenario of a communication processing method according to an embodiment of this disclosure.

For example, as shown in FIG. 4A, the terminal device includes an antenna element 1 to an antenna element 4. A phase on an antenna element is obtained by adjusting a phase shifter connected to the antenna element. It can be learned from FIG. 4A that all antenna elements of the terminal device are connected to a same phase shifter. As a result, phases of different antenna elements can be adjusted to a same phase only by using the phase shifter. Each antenna element set usually has a corresponding weight (that is, a phase-shift value), and different antenna element sets may be corresponding to different weights. In this case, all antenna elements are connected to a same phase shifter. As a result, in some cases, the terminal device cannot support division of the antenna elements into the antenna element sets.

For example, as shown in FIG. 3A, the antenna element 1 and the antenna element 2 are connected to the antenna port 1, and the antenna element 3 and the antenna element 4 are connected to the antenna port 1. The antenna element 1 and the antenna element 2 are connected to independent phase shifters, and the antenna element 3 and the antenna element 4 are connected to independent phase shifters. Therefore, the antenna element 1 and the antenna element 2 may belong to the antenna element set 1, and the antenna element 3 and the antenna element 4 may belong to the antenna element set 2. Each antenna element set has a corresponding phase-shift value.

Therefore, in the example shown in FIG. 3A, the terminal device may adjust the phase shifter 1 connected to the antenna element 1 and the phase shifter 2 connected to the antenna element 2 by using a phase-shift value corresponding to the antenna element set 1, to adjust phases of the antenna element 1 and the antenna element 2. The terminal device may adjust the phase shifter 3 connected to the antenna element 3 and the phase shifter 4 connected to the antenna element 4 by using a phase-shift value corresponding to the antenna element set 2, to adjust phases of the antenna element 3 and the antenna element 4. It can be learned that the terminal device may determine, based on a connection status between the antenna elements of the terminal device and the phase shifters, whether to support division of the antenna elements into antenna element sets.

2. The quantity of antenna element sets supported by the terminal device.

For example, three panels on the terminal device support division of the antenna element sets, and one panel supports two antenna element sets. For example, a vertical direction of the panel is corresponding to one antenna element set base, and a horizontal direction of the panel is corresponding to two antenna element set bases. One antenna element set base in the vertical direction of the panel and one antenna element set base in the horizontal direction of the panel form one antenna element set. In other words, the quantity of antenna element sets supported by the panel is 2, and distribution of the antenna element sets supported by the panel is 1*2. Alternatively, distribution of the antenna element sets supported by the panel is represented as $(P_V, P_H)=(1,2)$, where $P_V$ represents a quantity of antenna element set bases in the vertical direction of the panel, and $P_H$ represents a quantity of antenna element set bases in the horizontal direction of the panel. As shown in FIG. 3C(1), one black dashed line box represents one antenna element set. A quantity of antenna element sets supported by each of the other two panels is 4, and a vertical direction and a horizontal direction are respectively corresponding to two antenna element set bases, that is, the supported distribution of the antenna element sets is 2*2. As shown in FIG. 3C(2), one dashed line box represents one antenna element set.

3. The arrangement manner of the antenna element sets of the terminal device includes a correspondence between the antenna port and antenna elements included in the antenna element sets of the terminal device and/or an antenna element included in each antenna element set.

For example, as shown in FIG. 3B, the antenna element set 1 includes the antenna element 1 and the antenna element 2. The antenna element set 2 includes the antenna element 3 and the antenna element 4. The antenna element set 3 includes the antenna element 4 and the antenna element 5. The antenna element set 4 includes the antenna element 6 and the antenna element 7. An antenna port 1 is corresponding to antenna elements respectively included in the antenna element set 1 and the antenna element set 2. An antenna port 2 is corresponding to antenna elements respectively included in the antenna element set 3 and the antenna element set 4.

It should be noted that, in some implementations, the network device may determine, based on the capability information, a quantity of antenna element sets included in each of the M antenna element set groups, and indicate the quantity of antenna element sets included in each of the M antenna element set groups to the terminal device by using signaling. Alternatively, the network device and the terminal device determine, according to a specific rule, a quantity of antenna element sets included in each of the M antenna element set groups. Alternatively, the terminal device determines, based on the capability information of the terminal device, a quantity of antenna element sets included in each of the M antenna element set groups. For example, the terminal device determines, based on hardware performance of the terminal device, a quantity of antenna element sets included in each of the M antenna element set groups.

202: The terminal device sends, based on the first weight vectors respectively corresponding to the M antenna element set groups, a data signal on the antenna elements included in the M antenna element set groups.

Before step 202, the terminal device may generate, based on the precoding matrix, a signal on the antenna port. For a related indication manner of the precoding matrix, refer to the related descriptions of step 201*b*. The network device estimates a channel based on the SRS sent by the terminal device, to obtain the precoding matrix.

In some implementations, step 202 includes step 202*a* to step 202*c*.

Step 202*a*: The terminal device determines a first phase-shift value based on a transmission configuration indicator (TCI) state and a synchronization signal and physical broadcast channel block (SSB) index associated with the TCI state; or the terminal device determines a first phase-shift value based on a TCI state and a non-zero power channel state information reference signal (CSI-RS) resource index associated with the TCI state.

The first phase-shift value is a phase-shift value of each antenna element of the terminal device.

When a quasi co-location (QCL) type configured in the TCI state is a type D, the terminal device determines the first phase-shift value by using a resource index or an SSB index of a non-zero power CSI-RS corresponding to the QCL information in the TCI state. Each index of the non-zero power CSI-RS is corresponding to a transmit beam direction of one network device, and each SSB index is corresponding to a transmit beam direction of one network device. The terminal device selects, by using the transmit beam direction that is of the network device and that is indicated by the TCI state, a first phase-shift value corresponding to the transmit beam direction indicated by the TCI state (that is, the terminal device determines, based on the TCI state, a downlink receive beam), to receive a signal of the network device.

When sending a signal, the terminal device may utilize reciprocity between uplink and downlink beam directions to complete sending of uplink data by using a transmit beam direction (the transmit beam direction is corresponding to the first phase-shift value) that is the same as a downlink receive beam direction (determined based on the TCI state).

It should be noted that the terminal device may further determine the first phase-shift value used by the terminal device to send the SRS by using the SRS resource index indicated by the DCI. A plurality of SRS resources may be included in one SRS resource set. Each SRS resource in the SRS resource set is corresponding to one transmit beam direction, and the transmit beam direction corresponding to the SRS resource is indicated by SRS spatial relation information (SRS-SpatialRelationInfo). The SRS spatial relation information includes one SSB index and/or non-zero power CSI-RS resource index, and each SRS resource is corresponding to one SRS resource index.

Step 202*b*: The terminal device separately adjusts, based on the first weight vector and the first phase-shift value, phase-shift values of the antenna elements included in the M antenna element set groups.

In a possible implementation, the first weight vector includes second phase-shift values respectively corresponding to antenna element sets included in the M antenna element set groups. The second phase-shift values corresponding to the antenna element sets are second phase-shift values corresponding to antenna elements included in the antenna element sets. For example, if the antenna element set group 1 includes four antenna element sets, first four elements of the first weight vector are respectively second phase-shift values corresponding to antenna elements included in the four antenna element sets.

The terminal device determines a second phase-shift value corresponding to each antenna element by using the first weight vector. Then, the terminal device determines, based on the first phase-shift value and the second phase-shift value corresponding to each antenna element, a target phase-shift value corresponding to each antenna element. The terminal device adjusts a phase-shift value of a phase shifter on the antenna element by using the target phase-shift value corresponding to each antenna element, to adjust a phase of the antenna element. Then, the terminal device sends the data signal on the antenna elements included in the M antenna element set groups.

For example, a quantity of antenna element sets supported by the terminal device is R, and R=N1*N2. The terminal device obtains the first phase-shift value in the manner of step 202*a*. Based on step 201*b*, the terminal device determines, based on the index information of the first weight vector, the second vector, and phases of elements in the second vector $$v_{q,p} = \left[ u_p, \; e^{j\frac{2\pi q}{O_1 N_1}} u_p \; \ldots \; e^{j\frac{2\pi q(N_1 1)}{O_1 N_1}} u_p \right]^T$$

are second phase-shift values corresponding to the R antenna element sets. For example, phases of first N2 elements (that is, elements in $u_p$) of the second vector $v_{q,p}$ are respectively second phase-shift values corresponding to an antenna element set 1 to an antenna element set N2. An $N2^{th}$ element to a $(2*N2)^{th}$ element (that is, elements in $$e^{j\frac{2\pi q}{O_1 N_1}} u_p)$$

of the second vector $v_{q,p}$ are respectively second phase-shift values corresponding to an antenna element set N2+1 to an antenna element set 2*N2. The terminal device determines, based on the first phase-shift value and the second phase-shift value corresponding to each antenna element set, a target phase-shift value corresponding to each antenna element set. Then, the terminal device adjusts, by using the target phase-shift value corresponding to each antenna element set, a phase-shift value of a phase shifter connected to an antenna element included in each antenna element set. The terminal device sends the data signal on antenna elements included in N1*N2 antenna element sets.

For example, a quantity of antenna element sets supported by the terminal device is R, and R=N1*N2. The terminal device obtains the first phase-shift value in the manner of step 202*a*. Based on step 201*b*, the terminal device determines the R phase values by using the phase information of the first weight vector, where R=N1*N2. The terminal device determines that the R phase values are second phase-shift values corresponding to the R antenna element sets. The terminal device determines, based on the first phase-shift value and the second phase-shift value corresponding to each antenna element set, a target phase-shift value corresponding to each antenna element set. Then, the terminal device adjusts, by using the target phase-shift value corresponding to each antenna element set, a phase-shift value of a phase shifter connected to an antenna element included in each antenna element set, to adjust a phase of the antenna element included in the antenna element set. The terminal device sends the data signal on the antenna elements included in the R antenna element sets.

For example, a quantity of antenna element sets supported by the terminal device is R, and R=N1*N2. The terminal device obtains the first phase-shift value in the manner of step 202*a*. Based on step 201*b*, the indication information indicates the amplitude-phase weighted value. The terminal device determines the first weight vector based on the amplitude-phase weighted value, where the first weight vector includes R phase values, and R=N1*N2. The terminal device determines that the R phase values are second phase-shift values corresponding to the R antenna element sets. The terminal device determines, based on the first phase-shift value and the second phase-shift value of each antenna element, a target phase-shift value corresponding to each antenna element set. Then, the terminal device adjusts, by using the target phase-shift value corresponding to each antenna element set, a phase-shift value of a phase shifter connected to an antenna element included in each antenna element set, to adjust a phase of the antenna element included in the antenna element set. The terminal device sends the data signal on the antenna elements included in the R antenna element sets.

It can be learned that the terminal device generates, based on the precoding matrix, a signal on the antenna port. Then, the terminal device obtains the first phase-shift value in the manner of step 202*a*. According to the technical solutions of this disclosure, different antenna element sets have corresponding second phase-shift values. In other words, in an existing solution, an additional second phase-shift value is introduced to the antenna element set. In this case, the antenna element sets in the terminal device may be respectively corresponding to different phase-shift values. The terminal device may determine the second phase-shift value corresponding to each antenna element set in the terminal device by using the first weight vector. Then, the terminal device adjusts, with reference to the first phase-shift value and the second phase-shift value corresponding to each antenna element set, the phase of the antenna element included in each antenna element set.

Figure 4B:
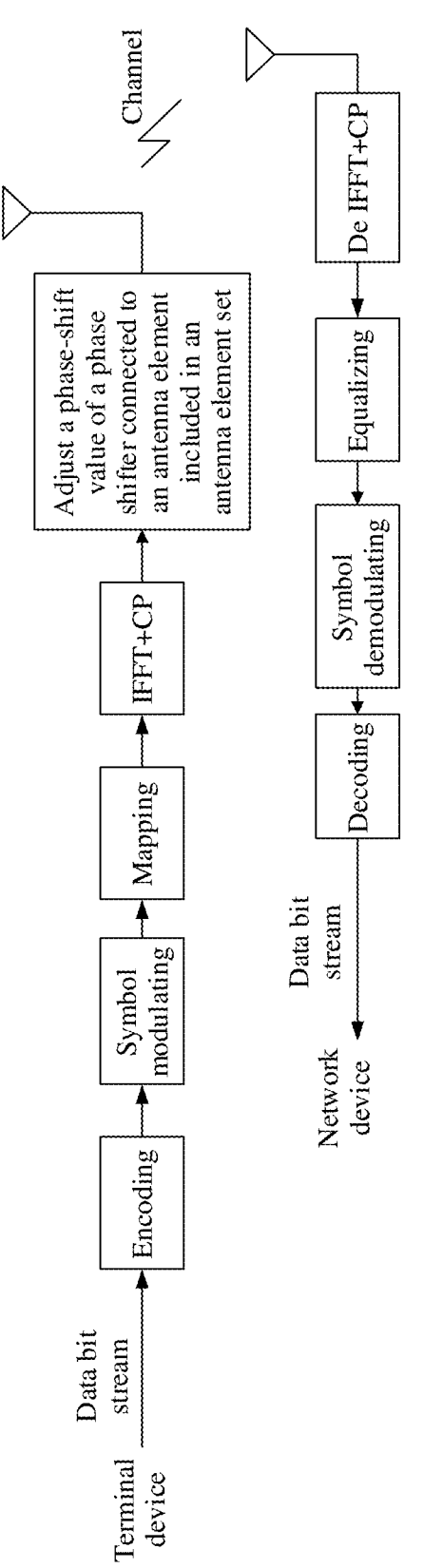
FIG. 4B is a schematic processing flowchart of a communication processing method according to an embodiment of this disclosure.

For example, as shown in FIG. 4B, processes of generation, encoding, symbol modulation, mapping, precoding, and the like of a data bit stream by the terminal device are similar to existing procedures. A difference lies in that the terminal device separately adjusts, based on the first weight vector indicated by the network device, a phase of an antenna element included in the antenna element set of the terminal device. The terminal device may adjust the phase of the antenna element by adjusting a phase-shift value of a phase shifter connected to the antenna element.

Figure 7A:
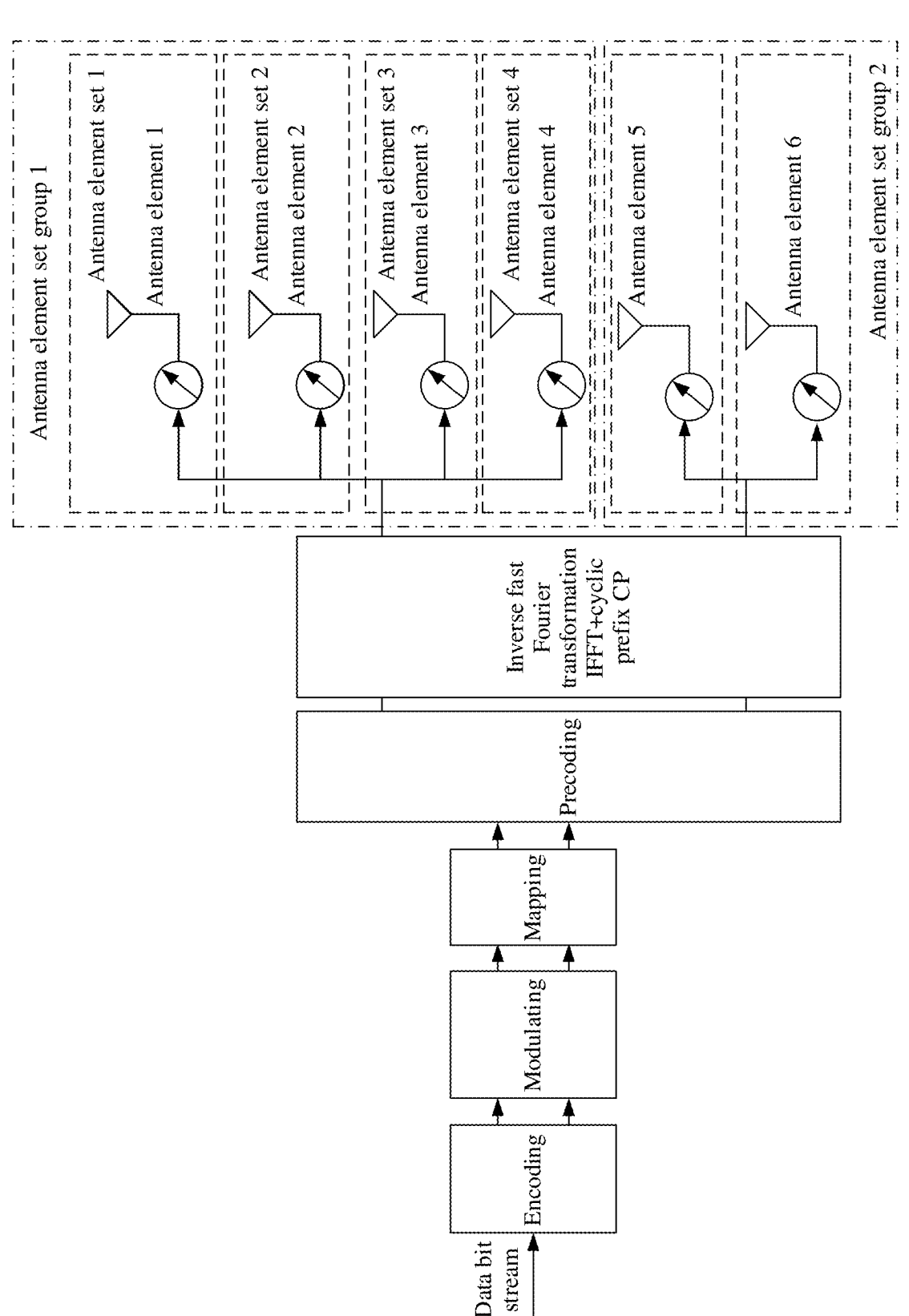
FIG. 7A is a schematic diagram of another scenario of a communication processing method according to an embodiment of this disclosure.

For example, in the example shown in FIG. 7A, an antenna element set group 1 includes four antenna element sets. A first weight vector corresponding to the antenna element set group 1 is $[1 -1\; 1 -1]^T$. According to step 204, a first phase-shift value of each antenna element that is in the antenna element set group 1 and that is determined by the terminal device is θ. The terminal device loads a phase-shift value θ on a phase shifter 1 connected to an antenna element included in an antenna element set 1. The terminal device loads a phase-shift value θ−π or θ−π on a phase shifter 2 connected to an antenna element included in an antenna element set 2. The terminal device loads a phase-shift value θ on a phase shifter 3 connected to an antenna element included in an antenna element set 3. The terminal device loads a phase-shift value θ+π or θ−π on a phase shifter 4 connected to an antenna element included in an antenna element set 4.

The following describes signal coverage effect obtained by the terminal device by performing the technical solution in the embodiment shown in FIG. 2.

FIG. 4C is a schematic diagram of effect of a communication processing method according to an embodiment of this disclosure. Refer to FIG. 4C, the terminal device adjusts a phase shifter by using the first phase-shift value in step 204, to determine an analog beam 1. The terminal device sends a signal through the analog beam 1, and a transmission path covered by the analog beam 1 is a group of transmission paths 1 shown in FIG. 4C. In an actual channel environment, energy of a group of transmission paths 2 is relatively close to energy of the transmission path 1. However, the terminal device performs the technical solution in the embodiment shown in FIG. 2, so that an analog beam finally determined by the terminal device should be an analog beam that can cover the transmission path 1 and the transmission path 2 shown in FIG. 4C. In this way, a spatial diversity gain of a channel is obtained, data demodulation performance is improved, and communication transmission performance is improved.

In this embodiment of this disclosure, the terminal device determines the first weight vectors respectively corresponding to the M antenna element set groups, and a first weight vector corresponding to at least one of the M antenna element set groups includes at least two elements. Each element is corresponding to an antenna element set in one antenna element set group, and different elements are corresponding to different antenna element sets. M is an integer greater than or equal to 1. Then, the terminal device sends, based on the first weight vectors respectively corresponding to the M antenna element sets, a signal on antenna elements included in the M antenna element set groups. It can be learned that, the first weight vector corresponding to the at least one of the M antenna element set groups includes at least two elements. Each element is corresponding to one antenna element set in the antenna element set group, and different elements are corresponding to different antenna element sets. Each antenna element set included in the at least one antenna element set group in the M antenna element set groups has a corresponding element that is used to adjust a phase of an antenna element included in the antenna element set. The terminal device sends, based on the first weight vectors respectively corresponding to the M antenna element set groups, a signal on antenna elements included in the M antenna element set groups. This helps the terminal device send the signal through an analog beam that better matches a channel characteristic, improving spectrum utilization and improving communication performance.

The network device may determine the precoding matrix based on the sounding reference signals sent by the terminal device. A determining process is similar to an existing procedure. In step 201 in the embodiment shown in FIG. 2, the network device may determine, based on the sounding reference signals sent by the terminal device, the first weight vectors respectively corresponding to the M antenna element set groups. In the M antenna element set groups, a manner of sending sounding reference signals in an antenna element set group that includes one antenna element set is similar to a manner of sending the existing sounding reference signals.

With reference to an embodiment shown in FIG. 5, the following describes a process in which a terminal device sends sounding reference signals in an antenna element set group that includes at least two antenna element sets, and a process in which a network device determines, based on the sounding reference signals, a first weight vector corresponding to the antenna element set group. It should be noted that the embodiment shown in FIG. 5 is described by using a first antenna element set group in M antenna element set groups as an example. For the M antenna element set groups, a process of sending sounding reference signals in another antenna element set group that includes at least two antenna element sets and a process of determining a first weight vector by the network device are also applicable.

FIG. 5 is a schematic diagram of another embodiment of a communication processing method according to an embodiment of this disclosure. Refer to FIG. 5. The communication processing method includes the following steps.

501: The terminal device sends sounding reference signals to the network device on antenna elements included in the first antenna element set group by using N resources. Correspondingly, the network device receives the sounding reference signals from the terminal device by using the N resources.

Time domain resources respectively occupied by the N resources are different. The sounding reference signals sent on the N resources are respectively based on different second weight vectors of the first antenna element set group. The second weight vector includes at least two elements, each of the at least two elements is corresponding to one antenna element set included in the first antenna element set, and each of the at least two elements is used to adjust a phase of an antenna element included in the antenna element set corresponding to the element. X is an integer greater than or equal to 1 and less than or equal to M.

The first antenna element set group includes at least two antenna element sets. A second weight vector on which sounding reference signals sent on each resource is based includes at least two elements, each element is corresponding to one of the at least two antenna element sets, and different elements are corresponding to different antenna element sets.

In some implementations, the time domain resources respectively occupied by the N resources are consecutive. For example, time domain symbols respectively occupied by the N resources are consecutive, and each resource occupies a different time domain symbol.

In some implementations, N is a quantity of antenna element sets included in the first antenna element set group.

In this implementation, the terminal device sends the sounding reference signals on the N resources. N is the quantity of antenna element sets included in the first antenna element set group. The network device may receive the sounding reference signals on the N resources from the terminal device. The network device may obtain information about a joint channel between an antenna element in each antenna element set included in the first antenna element set group and a receive antenna or a receive channel of the network device by using the sounding reference signals on the N resources. This helps the network device obtain channel information of a higher dimension. The network device may determine the first weight vector based on the obtained channel information. The first weight vector is used by the terminal device to: determine an analog beam that can better match a channel variation characteristic and then send a signal through the analog beam, improving communication performance.

As shown in FIG. 7A, after IFFT transformation and CP processing are performed on the sounding reference signals, the sounding reference signals are input to antenna elements included in antenna element sets. In this disclosure, signal multiplexing of a plurality of virtual ports (a plurality of antenna element sets) may be implemented in a time division multiplexing or time domain code division manner, to enable the network device to estimate a channel corresponding to each virtual port (antenna element set).

In a possible implementation, on a same frequency domain resource, time domain resources occupied by sounding reference signals on antenna elements in different antenna element sets in the first antenna element set group meet a time division multiplexing relationship. In other words, the sounding reference signals on different antenna element sets should be sent in a time division manner. Therefore, an antenna element included in a same antenna element set should be connected to a switch, and the switch is configured to control whether the antenna element included in the antenna element set sends sounding reference signals.

For example, each antenna element in a same antenna element set is connected to a switch, or antenna elements in a same antenna element set are connected to a same switch. Otherwise, after the terminal device performs IFFT processing and CP processing on the sounding reference signals, the sounding reference signals are transmitted to all antenna elements and sent. Consequently, sounding reference signals of different antenna element sets cannot be sent in the time division manner.

Therefore, if at least two antenna element sets in a same antenna element set group of the terminal device meet a first condition, the terminal device may send the sounding reference signals in a time division multiplexing manner. The first condition is: An antenna element included in a same antenna element set is connected to a switch, and the switch may be configured to control whether the antenna element included in the antenna element set sends sounding reference signals. The network device may obtain channel information of a higher dimension by using the sounding reference signals sent by the terminal device. The network device may determine, based on the obtained channel information, the first weight vector corresponding to the antenna element set group.

In another possible implementation, the terminal device may implement signal multiplexing of the plurality of virtual ports (the plurality of antenna element sets) in the time domain code division manner. The network device may obtain channel information of a higher dimension by using the sounding reference signals sent by the terminal device. The network device may determine, based on the obtained channel information, the first weight vector corresponding to the antenna element set group.

Optionally, the N resources are corresponding to N second weight vectors. If the second weight vector is a column vector, the N second weight vectors form a first matrix, any two row vectors in the first matrix are orthogonal to each other, and each row vector of the first matrix is an orthogonal code. Alternatively, if the second weight vector is a row vector, the N second weight vectors form a second matrix, any two column vectors in the second matrix are orthogonal to each other, and each column vector of the second matrix is an orthogonal code.

The orthogonal code includes any one of the following: an OCC code, a DFT code, or a TD-CDM code. The following uses the OCC code as an example for description.

It should be noted that, optionally, an interval between a start time domain position of a first resource in the N resources and an end time domain position of an $N^{th}$ resource in the N resources is less than or equal to a first threshold.

The first threshold is a threshold obtained through channel adaptive adjustment, a threshold configured by the network device, or a predefined threshold. The predefined threshold may be a maximum value that can meet the condition that channel time variability may be ignored for the interval between the start time domain position of the first resource in the N resources and the end time domain position of the $N^{th}$ resource in different scenarios (for example, scenarios corresponding to different moving speeds of the terminal device).

The interval between the start time domain position of the first resource in the N resources and the end time domain position of the last resource in the N resources is less than or equal to the first threshold. This ensures that channel time variability may be ignored for the interval between the start time domain position of the first resource in the N resources and the end time domain position of the last resource. Therefore, it is ensured that the sounding reference signals on the N resources meet orthogonality by using the orthogonal code.

It should be noted that, in some implementations, the channel time variability is related to a moving speed of the terminal device and a frequency of a frequency channel number used by the terminal device to transmit the sounding reference signals. When the terminal device uses a same frequency channel number to transmit a signal, a higher moving speed of the terminal device indicates faster channel time variability. When moving speeds of the terminal device are the same, a higher frequency of the frequency channel number used by the terminal device indicates faster channel time variability. Therefore, factors considered for setting a value of the first threshold may include the moving speed of the terminal device and the frequency of the frequency channel number used by the terminal device.

Figure 6A:
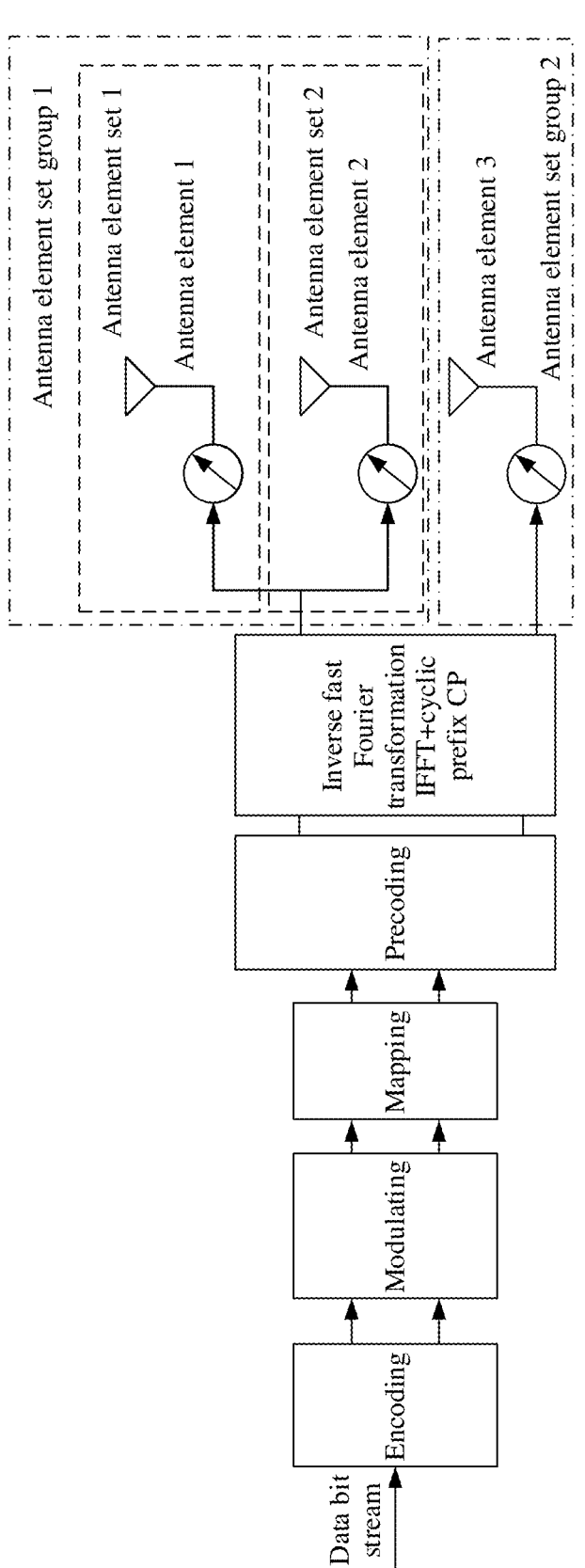
FIG. 6A is a schematic diagram of another scenario of a communication processing method according to an embodiment of this disclosure.

For example, as shown in FIG. 6A, an antenna element set group 1 includes two antenna element sets, which are respectively an antenna element set 1 and an antenna element set 2. The antenna element set 1 includes an antenna element 1, and the antenna element set 2 includes an antenna element 2. Therefore, the N resources include two resources, and the two resources are corresponding to two second weight vectors.

If the second weight vector is a column vector, the two second weight vectors are respectively $[1\ 1]^T$ and $[1\ -1]^T$, the two second weight vectors form a first matrix, and the first matrix is $$\begin{bmatrix} 1 & 1 \\ 1 & -1 \end{bmatrix}.$$

Two column vectors of the first matrix are respectively the two second weight vectors. Each row vector in the first matrix is an orthogonal code, and a first row vector and a second row vector are orthogonal to each other. The first row vector of the first matrix is an orthogonal code [1 1], and the second row vector is an orthogonal code [1 −1].

If the second weight vector is a row vector, the two second weight vectors are respectively [1 1] and [1 −1], the two weight vectors form a second matrix, and the second matrix is $$\begin{bmatrix} 1 & 1 \\ 1 & -1 \end{bmatrix}.$$

Two row vectors of the second matrix are respectively the two second weight vectors. Each column vector in the second matrix is an orthogonal code. A first column vector and a second column vector are orthogonal to each other. The first column vector of the second matrix is an orthogonal code $[1\ 1]^T$, and the second column vector is an orthogonal code $[1\ -1]^T$.

Figure 6B:
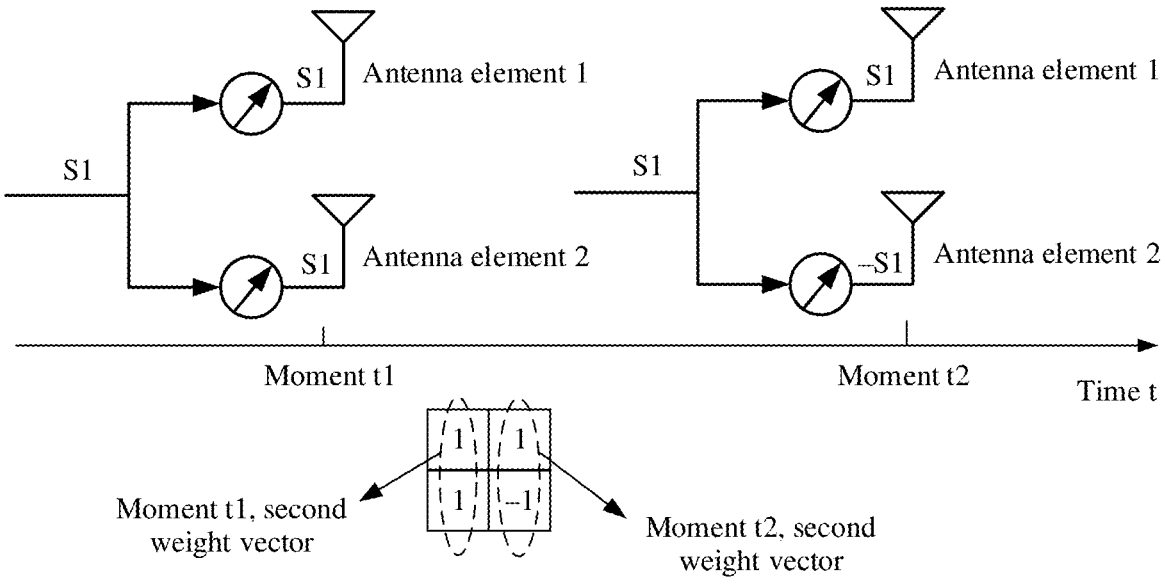
FIG. 6B is a schematic diagram of another scenario of a communication processing method according to an embodiment of this disclosure.

For example, as shown in FIG. 6B, at a moment t1 (the moment t1 is a start time domain position of a time domain resource occupied by a first resource in the N resources), the terminal device sends a sounding reference signal S1 on the antenna element 1 in the antenna element set 1, and sends the sounding reference signal S1 on the antenna element 2 in the antenna element set 2. At a moment t2 (the moment t2 is a start time domain position of a time domain resource occupied by a second resource in the N resources), the terminal device sends the sounding reference signal S1 on the antenna element 1 in the antenna element set 1, and sends a sounding reference signal −S1 on the antenna element 2 in the antenna element set 2.

In a possible implementation, the sounding reference signal −S1 may be sent by shifting a phase of a phase shifter 2 connected to the antenna element 2 in the antenna element set 2 by θ+π or θ−π. θ is a first phase-shift value that is of each antenna element and that is determined by the terminal device. For related descriptions, refer to the related descriptions of step 204 in the embodiment shown in FIG. 2.

In some implementations, units of t1 and t2 may be slots, time domain symbols, or fast Fourier transformation (FFT) sampling points. This is not limited in this disclosure.

In some implementations, a relationship between t1 and t2 may be t2=t1+Ns. A unit of Ns is the same as those of t1 and t2. For example, Ns may be one slot, one time domain symbol, a plurality of time domain symbols, $N_{fft}$ sampling points obtained after IFFT processing, or $N_{fft}/2$ sampling points obtained after IFFT processing, where $N_{fft}$ is a quantity of FFT points, a quantity of IFFT points, an FFT size (FFT size), or an IFFT size.

A value of Ns is less than or equal to the first threshold, to ensure that channel time variability at the moment t1 and the moment t2 may be ignored, and ensure that the sounding reference signals sent by the terminal device at the moment t1 and the moment t2 meet orthogonality by using orthogonal codes.

In some embodiments, the sounding reference signal S1 on each of the N resources includes a plurality of subsignals. Each resource occupies one time domain symbol in time domain, each resource occupies one slot in time domain, or each resource occupies one or more sampling points obtained after IFFT processing in time domain. This is not limited in this disclosure.

For example, each resource occupies one time domain symbol in time domain, and Ns is duration of two time domain symbols. For example, as shown in FIG. 6C-1, the sounding reference signal S1 occupies one time domain symbol. The terminal device sends the sounding reference signal S1 on the antenna element included in the antenna element set 1 by using a first resource. The terminal device sends the sounding reference signal S1 on the antenna element included in the antenna element set 2 by using the first resource. The terminal device sends the sounding reference signal S1 on the antenna element included in the antenna element set 1 by using a second resource. The terminal device sends the sounding reference signal −S1 on the antenna element included in the antenna element set 2 by using the second resource.

For example, each resource occupies two time domain symbols in time domain, and Ns is duration of four time domain symbols. For example, as shown in FIG. 6C-2, the sounding reference signal S1 occupies two time domain symbols. The terminal device sends the sounding reference signal S1 on the antenna element included in the antenna element set 1 by using a first resource. The terminal device sends the sounding reference signal S1 on the antenna element included in the antenna element set 2 by using the first resource. The terminal device sends the sounding reference signal S1 on the antenna element included in the antenna element set 1 by using a second resource. The terminal device sends the sounding reference signal −S1 on the antenna element included in the antenna element set 2 by using the second resource.

For example, each resource occupies one time domain symbol in time domain, and Ns is duration of three time domain symbols. For example, as shown in FIG. 6C-3, the sounding reference signal occupies one time domain symbol. The terminal device sends the sounding reference signal S1 on the antenna element included in the antenna element set 1 by using a first resource, and sends the sounding reference signal S1 on the antenna element included in the antenna element set 2 by using the first resource. The terminal device does not send a signal on the first resource. The terminal device sends the sounding reference signal S1 on the antenna element included in the antenna element set 1 by using a second resource, and sends the sounding reference signal −S1 on the antenna element included in the antenna element set 2 by using the second resource. The terminal device does not send a signal on the second resource.

In some implementations, the sounding reference signals sent on the N resources have different sequences. The terminal device generates sounding reference signals on different resources by using different sequences.

Figure 6D:
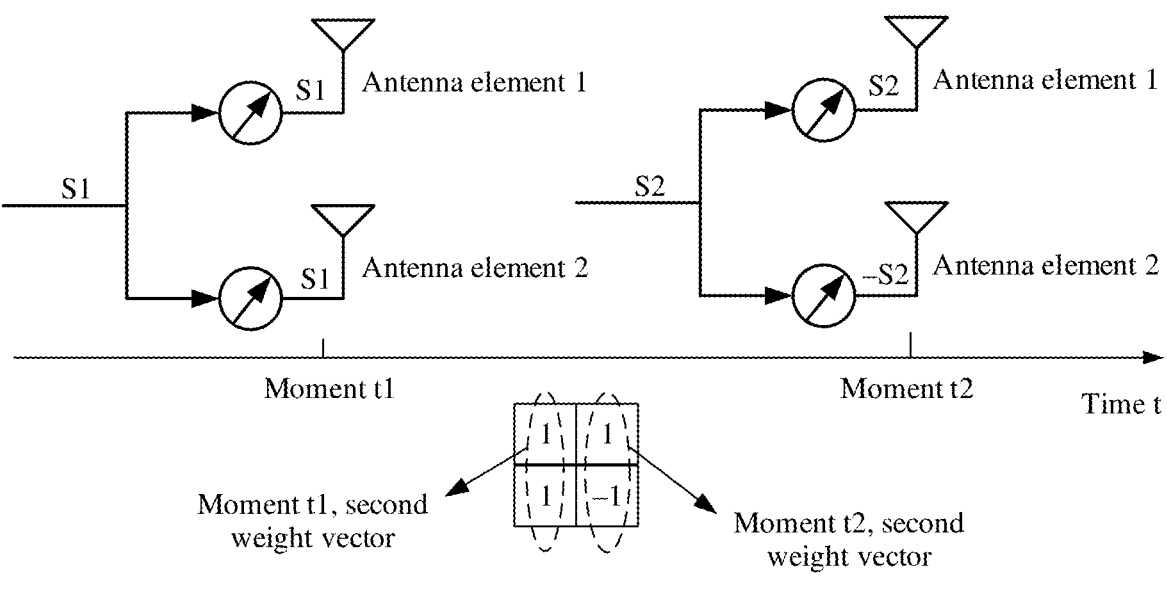
FIG. 6D is a schematic diagram of another scenario of a communication processing method according to an embodiment of this disclosure.

For example, as shown in FIG. 6D, at a moment t1 (the moment t1 is a start time domain position of a time domain resource occupied by a first resource), the terminal device sends the sounding reference signal S1 on the antenna element 1 in the antenna element set 1, and sends the sounding reference signal S1 on the antenna element 2 in the antenna element set 2. At a moment t2 (the moment t2 is a start time domain position of a time domain resource occupied by a second resource), the terminal device sends a sounding reference signal S2 on the antenna element 1 in the antenna element set 1, and sends a sounding reference signal −S2 on the antenna element 2 in the antenna element set 2. A sequence used to generate the sounding reference signal S1 is different from a sequence used to generate the sounding reference signal S2.

The sounding reference signals sent on the N resources are different, enhancing randomness of the sounding reference signals. Different sequences have different performance in different channel conditions. Therefore, when the terminal device sends different sequences of the sounding reference signals on the N resources, interference to another signal may be randomized, and average channel estimation performance is achieved in different channel conditions, improving robustness or stability of the channel estimation performance in different channel conditions.

Figure 7B:
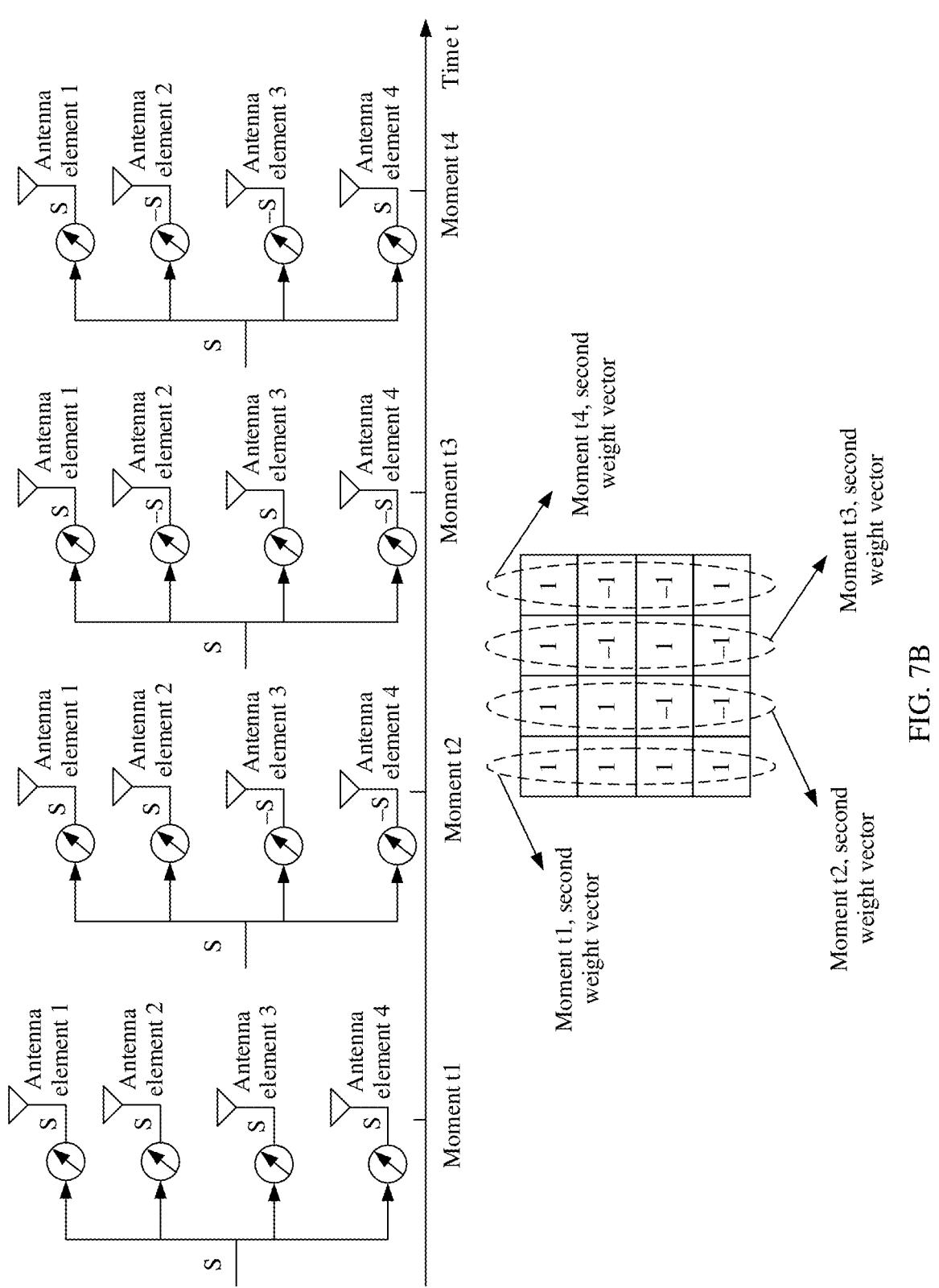
FIG. 7B is a schematic diagram of another scenario of a communication processing method according to an embodiment of this disclosure.

With reference to FIG. 7A and FIG. 7B, the following describes a process in which the terminal device sends sounding reference signals.

As shown in FIG. 7A and FIG. 7B, an antenna element set group 1 includes antenna element sets 1 to 4. Therefore, it can be learned that N=4. The antenna element set 1 includes an antenna element 1, the antenna element set 2 includes an antenna element 2, the antenna element set 3 includes an antenna element 3, and the antenna element set 4 includes an antenna element 4. Four resources are corresponding to four second weight vectors.

If the second weight vector is a column vector, the four second weight vectors are respectively $[1\ 1\ 1\ 1]^T$, $[1\ 1\ -1\ -1]^T$, $[1\ -1\ 1\ -1]^T$, and $[1\ -1\ -1\ 1]^T$. The four second weight vectors form a first matrix, and the first matrix is $$\begin{bmatrix} 1 & 1 & 1 & 1 \\ 1 & 1 & -1 & -1 \\ 1 & -1 & 1 & -1 \\ 1 & -1 & -1 & 1 \end{bmatrix}.$$

Four column vectors of the first matrix are respectively the four second weight vectors. Each row vector in the first matrix is an orthogonal code, and any two row vectors in the first matrix are orthogonal to each other. A first row vector of the first matrix is an orthogonal code [1 1 1 1]. A second row vector of the first matrix is an orthogonal code [1 1 −1 −1]. A third row vector of the first matrix is an orthogonal code [1 −1 1 −1]. A fourth row vector of the first matrix is an orthogonal code [1 −1 −1 1].

If the second weight vector is a row vector, the four second weight vectors are respectively [1 1 1 1], [1 1 −1 −1], [1 −1 1 −1], and [1 −1 −1 1]. The four second weight vectors form a second matrix, and the second matrix is $$\begin{bmatrix} 1 & 1 & 1 & 1 \\ 1 & 1 & -1 & -1 \\ 1 & -1 & 1 & -1 \\ 1 & -1 & -1 & 1 \end{bmatrix}.$$

Four row vectors of the second matrix are respectively the four second weight vectors. Each column vector of the second matrix is an orthogonal code, and any two column vectors in the second matrix are orthogonal to each other.

For example, as shown in FIG. 7B, at a moment t1 (the moment t1 is a start time domain position of a time domain resource occupied by a first resource), the terminal device separately sends a sounding reference signal S on each of antenna elements included in the antenna element sets 1 to 4. At a moment t2 (the moment t2 is a start time domain position of a time domain resource occupied by a second resource), the terminal device separately sends the sounding reference signal S on each of antenna elements included in the antenna element set 1 and the antenna element set 2, and separately sends a sounding reference signal −S on each of antenna elements included in the antenna element set 3 and the antenna element set 4. At a moment t3 (the moment t3 is a start time domain position of a time domain resource occupied by a third resource), the terminal device separately sends the sounding reference signal S on each of antenna elements included in the antenna element set 1 and the antenna element set 3, and separately sends the sounding reference signal −S on each of antenna elements included in the antenna element set 2 and the antenna element set 4. At a moment t4 (the moment t4 is a start time domain position of a time domain resource occupied by a fourth resource), the terminal device separately sends the sounding reference signal −S on each of antenna elements included in the antenna element set 2 and the antenna element set 3, and separately sends the sounding reference signal S on each of antenna elements included in the antenna element set 1 and the antenna element set 4.

Units of t1, t2, t3, and t4 may be time domain symbols, slots, or sampling points obtained after IFFT. A time between the moment t1 and the moment t4 is less than the first threshold. For related descriptions of the first threshold, refer to the foregoing related descriptions.

In some implementations, before step 501, the terminal device may determine a second weight vector corresponding to the first antenna element set group. The terminal device determines the second weight vector corresponding to the first antenna element set group in a plurality of manners. The following describes several possible implementations. Another implementation is still applicable to this disclosure. This is not limited in this disclosure.

Implementation 1: The terminal device obtains, from the network device, the second weight vector corresponding to the first antenna element set group.

For example, the network device indicates the second weight vector corresponding to the first antenna element set group by using configuration information of the sounding reference signals. For an indication manner, refer to the indication manner in step 202 in the embodiment shown in FIG. 2.

Implementation 2: The terminal device determines the second weight vector corresponding to the first antenna element set group according to a preset rule.

For ease of description, the row vector of the first matrix is referred to as an orthogonal code corresponding to an antenna element set. For example, an OCC code corresponding to an antenna element set may be bound to a number of the antenna element set. If the first antenna element set group includes two antenna element sets, which are respectively an antenna element set 1 and an antenna element set 2, an OCC code corresponding to the antenna element set 1 may be [1 1], and an OCC code corresponding to the antenna element set 2 may be [1 −1]. If the first antenna element set group includes four antenna element sets, which are respectively antenna element sets 1 to 4, an OCC code corresponding to the antenna element set 1 may be [1 1 1 1], an OCC code corresponding to the antenna element set 2 may be [1 1 −1 −1], an OCC code corresponding to the antenna element set 3 may be [1 −1 1 −1], and an OCC code corresponding to the antenna element set 4 may be [1 −1 −1 1].

It should be noted that the OCC code corresponding to the antenna element set may alternatively be determined in another manner. For example, a plurality of correspondences are predefined on the terminal device, and the network device may indicate one of the plurality of correspondences to the terminal device. The terminal device determines, based on the correspondence, the OCC code corresponding to the antenna element set. In this way, when some antenna elements are faulty, the network device may obtain more accurate channel information by configuring a dynamic correspondence.

In some implementations, a correspondence between an antenna element set and an antenna element may be pre-agreed on, or pre-specified, or may be indicated by the network device to the terminal device by using signaling.

Figure 7C:
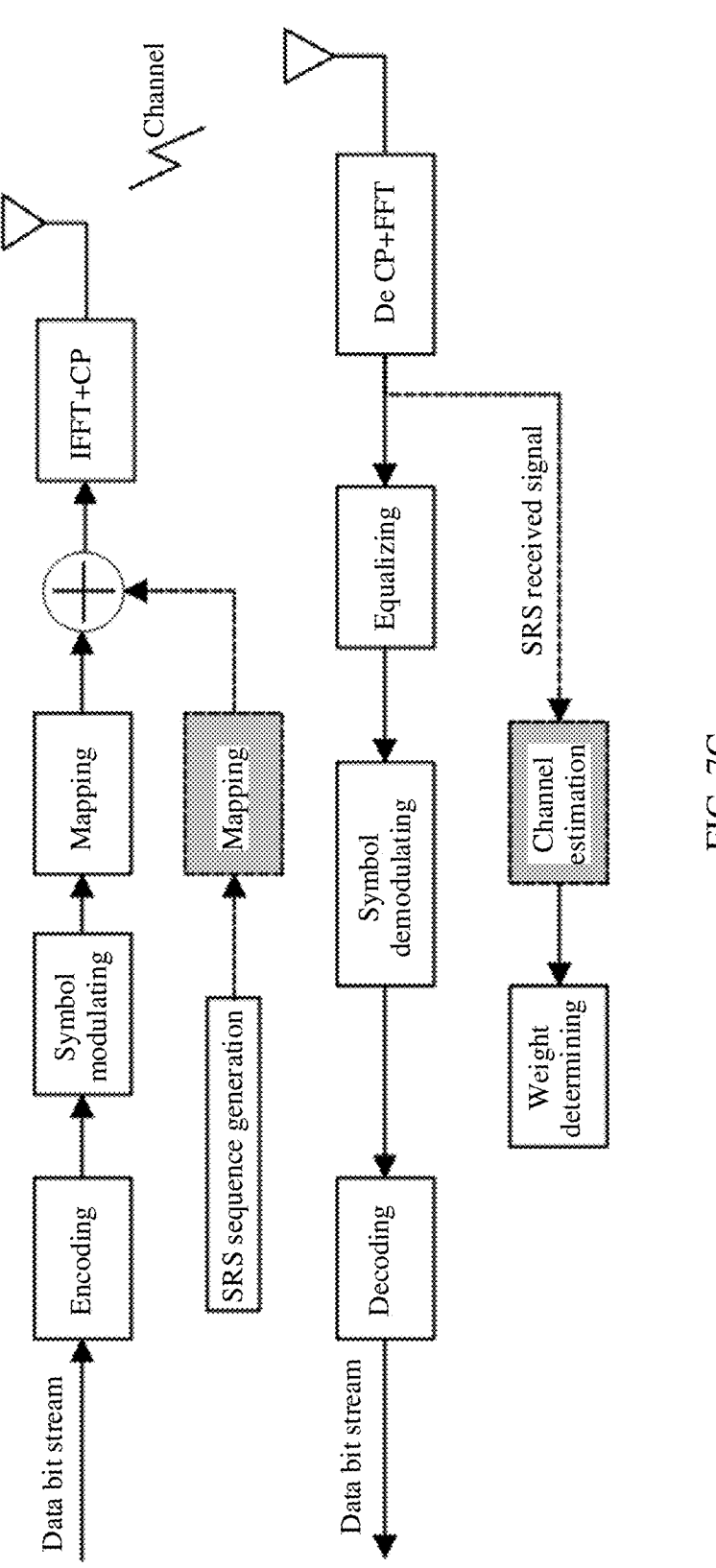
FIG. 7C is a schematic processing flowchart of a communication processing method according to an embodiment of this disclosure.

It can be learned that, in the technical solutions of this disclosure, as shown in FIG. 7C, in a process in which the terminal device sends the sounding reference signals, processes of generation, encoding, symbol modulation, and the like of a second data bit stream by the terminal device are similar to existing procedures, and a difference lies in mapping of the sounding reference signals. In the technical solutions of this disclosure, the terminal device needs to send the sounding reference signals at a plurality of moments. Therefore, the terminal device needs to map the SRS to a resource unit.

Optionally, the embodiment shown in FIG. 5 further includes step 501a. Step 501a may be performed before step 501.

501a: The network device sends configuration information to the terminal device. Correspondingly, the terminal device receives the configuration information from the network device.

The configuration information includes time-frequency position information of the N resources and information that indicates the N second weight vectors corresponding to the N resources. For related descriptions of the N resources, refer to the related descriptions of step 501 in the embodiment shown in FIG. 5. For an indication manner for indicating the N second weight vectors corresponding to the N resources, refer to the related descriptions of the indication manner of the indication information in step 202 in the embodiment shown in FIG. 2.

502: The network device determines, based on the sounding reference signals on the N resources, a first weight vector corresponding to the first antenna element set group.

The network device estimates, based on the sounding reference signals on the N resources, a joint channel between an antenna element included in each antenna element set in the first antenna element set group and a receive antenna or a receive channel. Then, the network device determines, based on the joint channel, the first weight vector corresponding to the first antenna element set group.

It can be learned that, in the technical solutions of this disclosure, as shown in FIG. 7B, the network device receives the sounding reference signals sent by the terminal device. The network device performs channel estimation based on the sounding reference signals sent by the terminal device. The network device obtains channel information through estimation based on sounding reference signals sent by the terminal device at a plurality of moments. The channel information includes the joint channel between the antenna element included in each antenna element set in the first antenna element set group and the receive antenna or the receive channel.

In some implementations, the first weight vector may be an orthogonal code, such as an OCC code, a DFT code, or a TD-CDM code.

For example, in the example shown in FIG. 6A, a signal $s_{t1}$ is a signal sent by the terminal device at a moment t1 by using a subcarrier 1. A signal $s_{t2}$ is a signal sent by the terminal device at a moment t2 by using the subcarrier 1. $H_{1,t1}$ is a joint channel between the antenna element included in the antenna element set 1 and the receive antenna or the receive channel at the moment t1. $H_{1,t2}$ is a joint channel between the antenna element included in the antenna element set 1 and the receive antenna or the receive channel at the moment t2. $H_{2,t1}$ is a joint channel between the antenna element included in the antenna element set 2 and the receive antenna or the receive channel at the moment t1. $H_{2,t2}$ is a joint channel between the antenna element included in the antenna element set 2 and the receive antenna or the receive channel at the moment t2. Because an interval between the moment t1 and the moment t2 is short, channel time variability may be ignored, so that $H_{1,t1}=H_{1,t2}$, and $H_{2,t1}=H_{2,t2}$ are true. The network device receives a signal $y_{t1}$ at the moment t1 through the receive antenna or the receive channel. The network device receives a signal $y_{t2}$ at the moment t2 through the receive antenna or the receive channel. $n_{t1}$ is noise received by the network device at the moment t1. $n_{t2}$ is a noise signal received by the network device at the moment t2. In this case, Formula 1 and Formula 2 may be obtained:

$$y_{t1}=H_{1,t1}s_{t1}+H_{2,t1}s_{t1}+n_{t1} \qquad \text{Formula 1}$$

$$y_{t2}=H_{1,t2}s_{t2}-H_{2,t2}s_{t2}+n_{t2} \qquad \text{Formula 2}$$

In this case, it can be learned from Formula 1 and Formula 2 that it is determined that $$\widehat{H_1} = \left(\frac{y_{t1}}{s_{t1}} + \frac{y_{t2}}{s_{t2}}\right)\Big/ 2$$

$$\widehat{H_2} = \left(\frac{y_{t1}}{s_{t1}} - \frac{y_{t2}}{s_{t2}}\right)\Big/ 2,$$

or represented as $$\begin{bmatrix} \widehat{H_1} \\ \widehat{H_2} \end{bmatrix} = \frac{1}{2}\begin{bmatrix} 1 & 1 \\ 1 & -1 \end{bmatrix}^T \begin{bmatrix} y_{t1} \\ y_{t2} \end{bmatrix}.$$

$\widehat{H_1}$ is a joint channel that is between the antenna element included in the antenna element set 1 and the receive antenna or the receive channel and that is estimated by the network device. $\widehat{H_2}$ is a joint channel that is between the antenna element included in the antenna element set 2 and the receive antenna or the receive channel and that is estimated by the network device. The two second weight vectors corresponding to the two resources are respectively $[1\ 1]^T$ and $[1\ -1]^T$, and $$\begin{bmatrix} 1 & 1 \\ 1 & -1 \end{bmatrix}$$

is a matrix formed by the two second weight vectors.

$$\begin{bmatrix} 1 & 1 \\ 1 & -1 \end{bmatrix}^T$$

is transposition of $$\begin{bmatrix} 1 & 1 \\ 1 & -1 \end{bmatrix}.$$

Then, the network device determines, based on $\widehat{H_1}$ and $\widehat{H_2}$, a first weight vector of the antenna element set group 1. For example, the network device performs singular value decomposition (SVD) on obtained channel information [ $\widehat{H_1}$

43

$\widehat{H_2}$] [$\widehat{H_1}$ $\widehat{H_2}$] of a higher dimension, to obtain a right singular matrix, and uses a first column vector of the right singular matrix as the first weight vector of the antenna element set group 1. Alternatively, the network device traverses an existing codebook of the first weight vector, successively multiplies the codebook and [$\widehat{H_1}$ $\widehat{H_2}$] to obtain equivalent channels, and separately calculates equivalent channel norms corresponding to the equivalent channels. The network device uses a codebook corresponding to an equivalent channel with a highest equivalent channel norm as the first weight vector of the antenna element set group 1.

For example, in the examples shown in FIG. 7A and FIG. 7B, the four second weight vectors corresponding to the four resources are respectively $[1\ 1\ 1\ 1]^T$, $[1\ 1\ -1\ -1]^T$, $[1\ -1\ 1\ -1]^T$, and $[1\ -1\ -1\ 1]^T$. The four second weight vectors form a first matrix, and the first matrix is $$\begin{bmatrix} 1 & 1 & 1 & 1 \\ 1 & 1 & -1 & -1 \\ 1 & -1 & 1 & -1 \\ 1 & -1 & -1 & 1 \end{bmatrix}.$$

Joint channels between the antenna element sets included in the antenna element set group 1 and the receive antenna or the receive channel obtained by the network device are:

$$\begin{bmatrix} \widehat{H}_1 \\ \widehat{H}_2 \\ \widehat{H}_3 \\ \widehat{H}_4 \end{bmatrix} = \frac{1}{2}\begin{bmatrix} 1 & 1 & 1 & 1 \\ 1 & 1 & -1 & -1 \\ 1 & -1 & 1 & -1 \\ 1 & -1 & -1 & 1 \end{bmatrix}^T \begin{bmatrix} y_{t1} \\ y_{t2} \\ y_{t3} \\ y_{t4} \end{bmatrix}$$

$\widehat{H_1}$ is a joint channel that is between the antenna element included in the antenna element set 1 and the receive antenna or the receive channel and that is estimated by the network device. $\widehat{H_2}$ is a joint channel that is between the antenna element included in the antenna element set 2 and the receive antenna or the receive channel and that is estimated by the network device. $\widehat{H_3}$ is a joint channel that is between the antenna element included in the antenna element set 3 and the receive antenna or the receive channel and that is estimated by the network device. $\widehat{H_4}$ is a joint channel that is between the antenna element included in the antenna element set 4 and the receive antenna or the receive channel and that is estimated by the network device.

The network device receives a signal $y_{t1}$ at the moment t1 through the receive antenna or the receive channel. The network device receives a signal $y_{t2}$ at the moment t2 through the receive antenna or the receive channel. The network device receives a signal $y_{t3}$ at the moment t3 through the receive antenna or the receive channel. The network device receives a signal $y_{t4}$ at the moment t4 through the receive antenna or the receive channel. Then, the network device determines, based on $\widehat{H_1}$, $\widehat{H_2}$, $\widehat{H_3}$, and $\widehat{H_4}$, a first weight vector of each antenna element set in the antenna element set group 1.

It can be learned from the foregoing example that the network device may separately obtain joint channels between antenna elements included in the first antenna element set group and the receive antenna or the receive channel. Compared with an existing solution, only one corresponding joint channel can be obtained for one antenna port or one digital channel. A channel dimension obtained by the network device by using the technical solution of this disclosure may be increased by N times, where N is a quantity of antenna element sets included in the first antenna element set group. In this way, the network device may determine, based on the obtained channel information of the higher dimension, the first weight vector corresponding to the first antenna element set group, so that the terminal device determines, based on the first weight vector, an analog beam that better matches a channel variation characteristic, improving communication performance.

For example, the network device indicates the first weight vector corresponding to the first antenna element set group to the terminal device by using an index of the OCC code. For example, in the example shown in FIG. 7A, the network device indicates an index value 0 to the terminal device, indicating that the first weight vector corresponding to the first antenna element set group is $[1\ 1\ 1\ 1]^T$. The network device indicates an index value 1 to the terminal device, indicating that the first weight vector corresponding to the first antenna element set group is $[1\ 1\ -1\ -1]^T$. The network device indicates an index value 2 to the terminal device, indicating that the first weight vector corresponding to the first antenna element set group is $[1\ -1\ 1\ -1]^T$. The network device indicates an index value 3 to the terminal device, indicating that the first weight vector corresponding to the first antenna element set group is $[1\ -1\ -1\ 1]^T$.

The following describes some examples in which the first weight vector is a DFT code.

For example, in the example shown in FIG. 6A, the first weight vector corresponding to the antenna element set group 1 may be any one of the following DFT codes:

$$\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix}, \text{and } \frac{1}{\sqrt{2}}\begin{bmatrix}1\\-j\end{bmatrix}.$$

For example, in the example shown in FIG. 7A, the first weight vector corresponding to the antenna element set group 1 may alternatively be any one of the following DFT codes:

$$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}0\\0\\0\\1\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix},$$

$$\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}, \frac{1}{2}\begin{bmatrix}1\\1\\1\\-1\end{bmatrix}, \frac{1}{2}\begin{bmatrix}1\\1\\j\\j\end{bmatrix}, \frac{1}{2}\begin{bmatrix}1\\1\\-1\\1\end{bmatrix},$$

$$\frac{1}{2}\begin{bmatrix}1\\-j\\-j\end{bmatrix}, \frac{1}{2}\begin{bmatrix}1\\j\\1\\j\end{bmatrix}, \frac{1}{2}\begin{bmatrix}1\\j\\j\\1\end{bmatrix}, \frac{1}{2}\begin{bmatrix}1\\j\\-1\\-j\end{bmatrix}, \frac{1}{2}\begin{bmatrix}1\\j\\-j\\-1\end{bmatrix}, \frac{1}{2}\begin{bmatrix}1\\-1\\1\\1\end{bmatrix}, \frac{1}{2}\begin{bmatrix}1\\-1\\j\\-j\end{bmatrix},$$

$$\frac{1}{2}\begin{bmatrix}1\\-1\\-1\\-1\end{bmatrix}, \frac{1}{2}\begin{bmatrix}1\\-1\\-j\\j\end{bmatrix}, \frac{1}{2}\begin{bmatrix}1\\-j\\1\\-j\end{bmatrix}, \frac{1}{2}\begin{bmatrix}1\\-j\\j\\1\end{bmatrix}, \frac{1}{2}\begin{bmatrix}1\\-j\\-1\\j\end{bmatrix}, \frac{1}{2}\begin{bmatrix}1\\1\\1\\1\end{bmatrix},$$

$$\frac{1}{2}\begin{bmatrix}1\\1\\-1\\-1\end{bmatrix}, \frac{1}{2}\begin{bmatrix}1\\j\\j\\-j\end{bmatrix}, \frac{1}{2}\begin{bmatrix}1\\j\\-j\\1\end{bmatrix}, \frac{1}{2}\begin{bmatrix}1\\-1\\-1\\1\end{bmatrix}, \frac{1}{2}\begin{bmatrix}1\\-j\\j\\1\end{bmatrix}, \text{and } \frac{1}{2}\begin{bmatrix}1\\-j\\-j\\-1\end{bmatrix}.$$

The foregoing DFT codes are merely an example. During actual application, the DFT code may not include an element 0 because the element 0 indicates that an antenna element in an antenna element set corresponding to the element 0 does not send a signal. Therefore, when the antenna element set cannot be turned off, modulus values of all elements of any DFT code are the same, that is, any DFT code cannot include the element 0.

It should be noted that an element in the DFT code may further include a value corresponding to another phase. ±45° is corresponding to $$\pm \frac{1}{\sqrt{2}},$$

and ±135° is corresponding to $$\pm j * \frac{1}{\sqrt{2}}.$$

A corresponding weight vector may be configured for the terminal device with reference to precision of a phase shifter connected to an antenna element. For example, an adjustment range of the phase shifter is 2π. When a bit width of the phase shifter of the antenna element is 2, a phase shift of {π/2, π, 3π/2} may be implemented. The bit width of the phase shifter means a data volume that can be transmitted by the phase shifter at a time, and may be understood as a data width that can be transferred by the phase shifter at a time. For example, when a bit width of the phase shifter of the antenna element is 3, a phase shift of {0, π/4, π/2, 3π/4, π, 5π/4, 3π/2, 7π/4} may be implemented, that is, the DFT code may include elements corresponding to ±45° and ±135°.

It should be noted that, in some implementations, a phase corresponding to an element in the foregoing DFT code is not limited to a value of a phase shifter of a corresponding antenna element. For example, the DFT code indicates that a phase-shift value of a phase shifter connected to an antenna element is adjusted to 90°. However, due to a precision problem of the phase shifter, the phase-shift value can be adjusted only to 89°. Therefore, during actual application, the terminal device sends a signal by using a weight corresponding to the phase-shift value 89°. Therefore, the phase corresponding to the element in the DFT code is not equivalent to a phase-shift value of the phase shifter of the antenna element finally obtained through adjustment.

It should be noted that, in some implementations, the DFT code may not include a multiplier factor. A value of each element in each DFT code may be 1. For example, whether the antenna port or the digital channel connected to the antenna elements included in the first antenna element set group is connected to a signal amplifier may be considered. If the signal amplifier is connected, the value of each element in each DFT code may be 1. If there is no signal amplifier, the value of each element in each DFT code is 1/N, where N is the quantity of antenna element sets included in the first antenna element set group.

In this embodiment of this application, the network device may obtain the channel information of the higher dimension by using the sounding reference signals sent by the terminal device. The network device determines, based on the channel information of the higher dimension, a condition that should be met by an analog beam of the terminal device. The network device determines, based on the channel information of the higher dimension, the first weight vectors respectively corresponding to the M antenna element set groups of the terminal device. In other words, the network device participates in a process in which the terminal device determines an analog beam. The terminal device may determine, based on the first weight vector, the analog beam that better matches the channel characteristic, and send a data signal through the analog beam, to enhance energy of the signal received by the network device, improve spectrum utilization, and improve communication performance.

Figure 8:
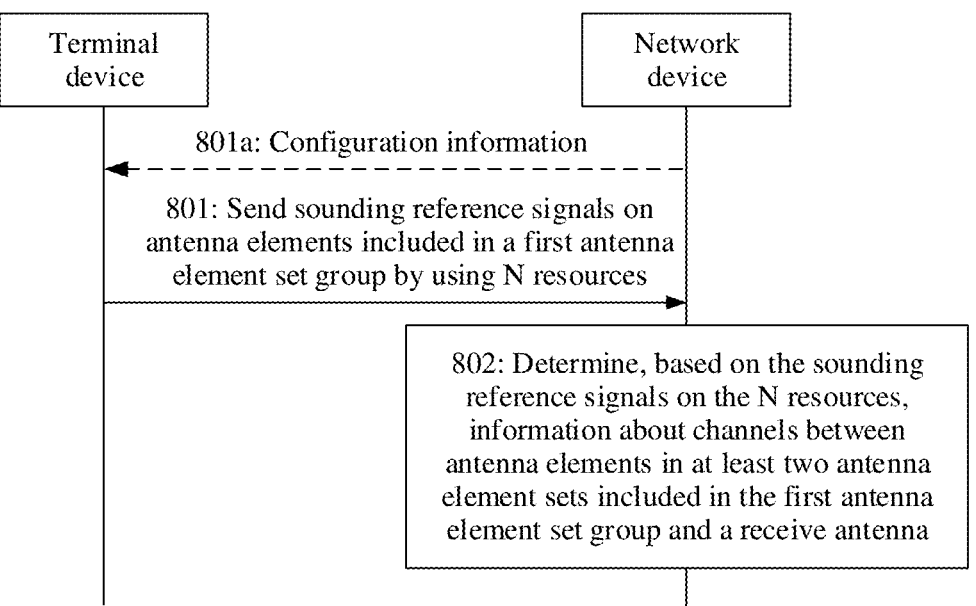
FIG. 8 is a schematic diagram of another embodiment of a communication processing method according to an embodiment of this disclosure.

FIG. 8 is a schematic diagram of another embodiment of a communication processing method according to an embodiment of this disclosure. Refer to FIG. 8. The communication processing method includes the following steps.

801: A terminal device sends sounding reference signals on antenna elements included in a first antenna element set group by using N resources.

Step 801 is similar to step 501 in the embodiment shown in FIG. 5. For details, refer to the related descriptions of step 501 in the embodiment shown in FIG. 5.

Optionally, the embodiment shown in FIG. 8 further includes step 801*a*. Step 801*a* may be performed before step 801.

801*a*: A network device sends configuration information to the terminal device. Correspondingly, the terminal device receives the configuration information from the network device.

Step 801*a* is similar to step 501*a* in the embodiment shown in FIG. 5. For details, refer to the related descriptions of step 501*a* in the embodiment shown in FIG. 5.

802: The network device determines, based on the sounding reference signals on the N resources, information about channels between antenna elements in at least two antenna element sets included in the first antenna element set group and a receive antenna or a receive channel.

A process in which the network device determines the information about the channels between the antenna elements in the at least two antenna element sets included in the first antenna element set group and the receive antenna or the receive channel is similar to the process in which the network device determines the channel information in the embodiment shown in FIG. 5. For details, refer to the related descriptions in the embodiment shown in FIG. 5.

It can be learned from the embodiment shown in FIG. 8 that, the network device may obtain, by using the sounding reference signals sent by the terminal device, the information about the channels between the antenna elements in the at least two antenna element sets included in the first antenna element set group and the receive antenna or the receive channel. It can be learned that the network device may obtain channel information of a higher dimension, improving precision of channel information obtained by the network device, and helping the network device more accurately determine a channel variation characteristic.

Figure 9:
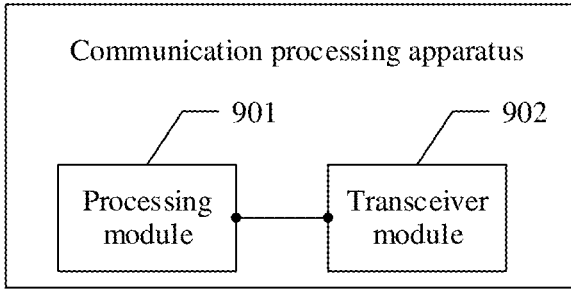
FIG. 9 is a schematic diagram of a structure of a communication processing apparatus according to an embodiment of this disclosure.

The following describes a communication processing apparatus provided in an embodiment of this disclosure. FIG. 9 is a schematic diagram of a structure of a communication processing apparatus according to an embodiment of this disclosure. The communication processing apparatus may be configured to perform the steps performed by the terminal device in embodiments shown in FIG. 2, FIG. 5, and FIG. 8. For details, refer to the related descriptions in the foregoing method embodiments.

The communication processing apparatus includes a processing module 901 and a transceiver module 902.

The processing module 901 is configured to determine first weight vectors respectively corresponding to M antenna element set groups, where at least one antenna element set group in the M antenna element set groups includes at least two antenna element sets, and a first weight vector corresponding to each of the at least one antenna element set group includes at least two elements; each element is corresponding to one antenna element set in the antenna element set group, and each element is used to adjust a phase of an antenna element included in the antenna element set corresponding to the element; different elements are corresponding to different antenna element sets; and M is an integer greater than or equal to 1.

The transceiver module 902 is configured to send, based on the first weight vectors respectively corresponding to the M antenna element set groups, a signal on antenna elements included in the M antenna element set groups.

In a possible implementation, the transceiver module 902 is further configured to:

receive indication information from a network device, where the indication information indicates the first weight vectors respectively corresponding to the M antenna element set groups of the communication processing apparatus.

In another possible implementation, the M antenna element set groups include a first antenna element set group, and the first antenna element set group includes at least two antenna element sets.

The transceiver module 902 is further configured to:

send sounding reference signals to the network device on antenna elements included in the first antenna element set group by using N resources, where time domain resources respectively occupied by the N resources are different, and the sounding reference signals sent on the N resources are based on different second weight vectors of the first antenna element set group; the second weight vector includes at least two elements, each of the at least two elements is corresponding to one antenna element set included in the first antenna element set, and each of the at least two elements is used to adjust a phase of an antenna element included in the antenna element set corresponding to the element; and different elements are corresponding to different antenna element sets.

In another possible implementation, the time domain resources respectively occupied by the N resources are consecutive.

In another possible implementation, N is a quantity of antenna element sets included in the first antenna element set group.

In another possible implementation, the N resources are corresponding to N second weight vectors.

If the second weight vector is a column vector, any two row vectors in a first matrix formed by the N second weight vectors are orthogonal to each other.

Alternatively, if the second weight vector is a row vector, any two column vectors in a second matrix formed by the N second weight vectors are orthogonal to each other.

In another possible implementation, each row vector of the first matrix is an orthogonal code.

In another possible implementation, each column vector of the second matrix is an orthogonal code.

In another possible implementation, the orthogonal code includes any one of the following: an OCC code, a DFT code, or a TD-CDM code.

In another possible implementation, the second weight vector is a column vector.

The N second weight vectors include two second weight vectors, and orthogonal codes of the two second weight vectors are respectively $[1\ 1]^T$ and $[1\ -1]^T$.

Alternatively, the N second weight vectors include four second weight vectors, and orthogonal codes of the four second weight vectors are respectively $[1\ 1\ 1\ 1]^T$, $[1\ 1\ -1\ -1]^T$, $[1\ -1\ 1\ -1]^T$, and $[1\ -1\ -1\ 1]^T$.

In another possible implementation, the second weight vector is a row vector.

The N second weight vectors include two second weight vectors, and orthogonal codes of the two second weight vectors are respectively $[1\ 1]$ and $[1\ -1]$.

Alternatively, the N second weight vectors include four second weight vectors, and orthogonal codes of the four second weight vectors are respectively $[1\ 1\ 1\ 1]$, $[1\ 1\ -1\ -1]$, $[1\ -1\ 1\ -1]$, and $[1\ -1\ -1\ 1]$.

In another possible implementation, the sounding reference signals sent on different resources in the N resources have different sequences.

In another possible implementation, the transceiver module 902 is configured to:

receive DCI from the network device, where the DCI carries indication information of the first weight vectors respectively corresponding to the M antenna element set groups.

In another possible implementation, the DCI includes an A-TPMI, and the A-TPMI indicates a precoding matrix and the first weight vector.

In another possible implementation, the transceiver module 902 is configured to:

receive RRC signaling or a MAC CE from the network device, where the RRC signaling or the MAC CE includes the indication information.

In another possible implementation, the transceiver module 902 is further configured to:

send capability information to the network device, where the capability information includes at least one of the following: whether the communication processing apparatus supports division of antenna elements into antenna element sets, a quantity of antenna element sets supported by the communication processing apparatus, and an arrangement manner of the antenna element sets of the communication processing apparatus.

In another possible implementation, the indication information indicates index information of the first weight vector.

The processing module 901 is configured to: determine the first weight vector based on the index information of the first weight vector.

Alternatively, the indication information indicates phase information of an element in the first weight vector.

The processing module 901 is configured to: determine the first weight vector based on the phase information of the element in the first weight vector.

Alternatively, the indication information indicates a plurality of amplitude-phase weighted values. The amplitude-phase weighted value includes a plurality of elements, and each element in the amplitude-phase weighted value is corresponding to one fourth weight vector.

The processing module 901 is configured to:

determine a plurality of third weight vectors based on the amplitude-phase weighted value and a plurality of fourth weight vectors; and determine the first weight vector based on the plurality of third weight vectors.

In another possible implementation, the transceiver module 902 is further configured to:

receive configuration information from the network device, where the configuration information includes time-frequency position information of the N resources and the N second weight vectors corresponding to the N resources.

In another possible implementation, the transceiver module 902 is configured to:

determine a first phase-shift value based on a TCI state and an SSB index associated with the TCI state; or determine a first phase-shift value based on a TCI state and a CSI-RS resource index associated with the TCI state;

separately adjust, based on the first weight vector and the first phase-shift value, phase-shift values of the antenna elements included in the M antenna element set groups; and send the signal through the antenna elements included in the M antenna element set groups.

Figure 10:
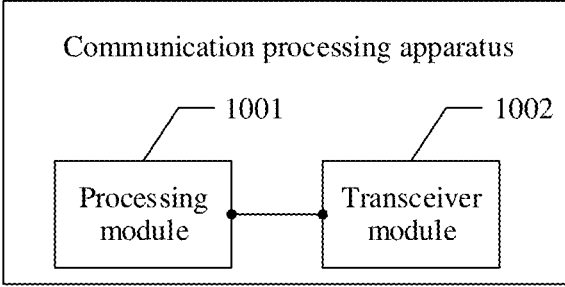
FIG. 10 is a schematic diagram of another structure of a communication processing apparatus according to an embodiment of this disclosure.

The following describes a communication processing apparatus provided in an embodiment of this disclosure. FIG. 10 is a schematic diagram of a structure of a communication processing apparatus according to an embodiment of this disclosure. The communication processing apparatus may be configured to perform the steps performed by the network device in embodiments shown in FIG. 2, FIG. 5, and FIG. 8. For details, refer to the related descriptions in the foregoing method embodiments.

The communication processing apparatus includes a processing module 1001 and a transceiver module 1002.

The processing module 1001 is configured to determine first weight vectors respectively corresponding to M antenna element set groups of a terminal device, where at least one antenna element set group in the M antenna element set groups includes at least two antenna element sets, and a first weight vector corresponding to each of the at least one antenna element set group includes at least two elements. Each element is corresponding to one antenna element set in each antenna element set group, and each element is used to adjust a phase of an antenna element included in the antenna element set corresponding to the element. Different elements are corresponding to different antenna element sets. M is an integer greater than or equal to 1.

The transceiver module 1002 is configured to send indication information to the terminal device, where the indication information indicates the first weight vectors respectively corresponding to the M antenna element set groups, and the first weight vectors respectively corresponding to the M antenna element set groups are used by the terminal device to send a signal on antenna elements included in the M antenna element set groups.

In a possible implementation, the M antenna element set groups include a first antenna element set group, and the first antenna element set group includes at least two antenna element sets.

The transceiver module 1002 is further configured to:

receive sounding reference signals sent by the terminal device on antenna elements included in the first antenna element set group by using N resources, where time domain resources respectively occupied by the N resources are different, and the sounding reference signals received on the N resources are based on different second weight vectors of the first antenna element set group.

The processing module 1001 is configured to:

determine, based on the sounding reference signals on the N resources, a first weight vector corresponding to the first antenna element set group.

In another possible implementation, the time domain resources respectively occupied by the N resources are consecutive.

In another possible implementation, N is a quantity of antenna element sets included in the first antenna element set group.

In another possible implementation, the N resources are corresponding to N second weight vectors.

If the second weight vector is a column vector, any two row vectors in a first matrix formed by the N second weight vectors are orthogonal to each other.

Alternatively, if the second weight vector is a row vector, any two column vectors in a second matrix formed by the N second weight vectors are orthogonal to each other.

In another possible implementation, each row vector of the first matrix is an orthogonal code.

In another possible implementation, each column vector of the second matrix is an orthogonal code.

In another possible implementation, the orthogonal code includes any one of the following: an OCC code, a DFT code, or a TD-CDM code.

In another possible implementation, the N second weight vectors include two second weight vectors, and orthogonal codes of the two second weight vectors are respectively $[1\ 1]^T$ and $[1\ -1]^T$.

Alternatively, the N second weight vectors include four second weight vectors, and orthogonal codes of the four second weight vectors are respectively $[1\ 1\ 1\ 1]^T$, $[1\ 1\ -1\ -1]^T$, $[1\ -1\ 1\ -1]^T$, and $[1\ -1\ -1\ 1]^T$.

In another possible implementation, the N second weight vectors include two second weight vectors, and orthogonal codes of the two second weight vectors are respectively $[1\ 1]$ and $[1\ -1]$.

Alternatively, the N second weight vectors include four second weight vectors, and orthogonal codes of the four second weight vectors are respectively $[1\ 1\ 1\ 1]$, $[1\ 1\ -1\ -1]$, $[1\ -1\ 1\ -]$, and $[1\ -1\ -1\ 1]$.

In another possible implementation, the sounding reference signals sent on different resources in the N resources have different sequences.

In another possible implementation, the transceiver module 1002 is configured to:

send DCI to the terminal device, where the DCI carries indication information that indicates the first weight vectors respectively corresponding to the M antenna element set groups.

In another possible implementation, the DCI includes an A-TPMI, and the A-TPMI indicates a precoding matrix and the first weight vector.

In another possible implementation, the transceiver module 1002 is configured to:

send RRC signaling or a MAC CE to the terminal device, where the RRC signaling or the MAC CE includes the indication information.

In another possible implementation, the transceiver module 1002 is further configured to:

receive capability information from the terminal device.

The capability information includes at least one of the following: information indicating whether the terminal device supports division of antenna elements into antenna element sets, a quantity of antenna element sets supported by the terminal device, and an arrangement manner of the antenna element sets of the terminal device.

In another possible implementation, the indication information indicates index information of the first weight vector.

Alternatively, the indication information indicates phase information of an element in the first weight vector.

Alternatively, the indication information indicates an amplitude-phase weighted value. The amplitude-phase weighted value includes a plurality of elements, and each element in the amplitude-phase weighted value is corresponding to one fourth weight vector.

In another possible implementation, the transceiver module 1002 is further configured to:

send configuration information to the terminal device, where the configuration information includes time-frequency position information of the N resources and the N second weight vectors corresponding to the N resources.

Figure 11:
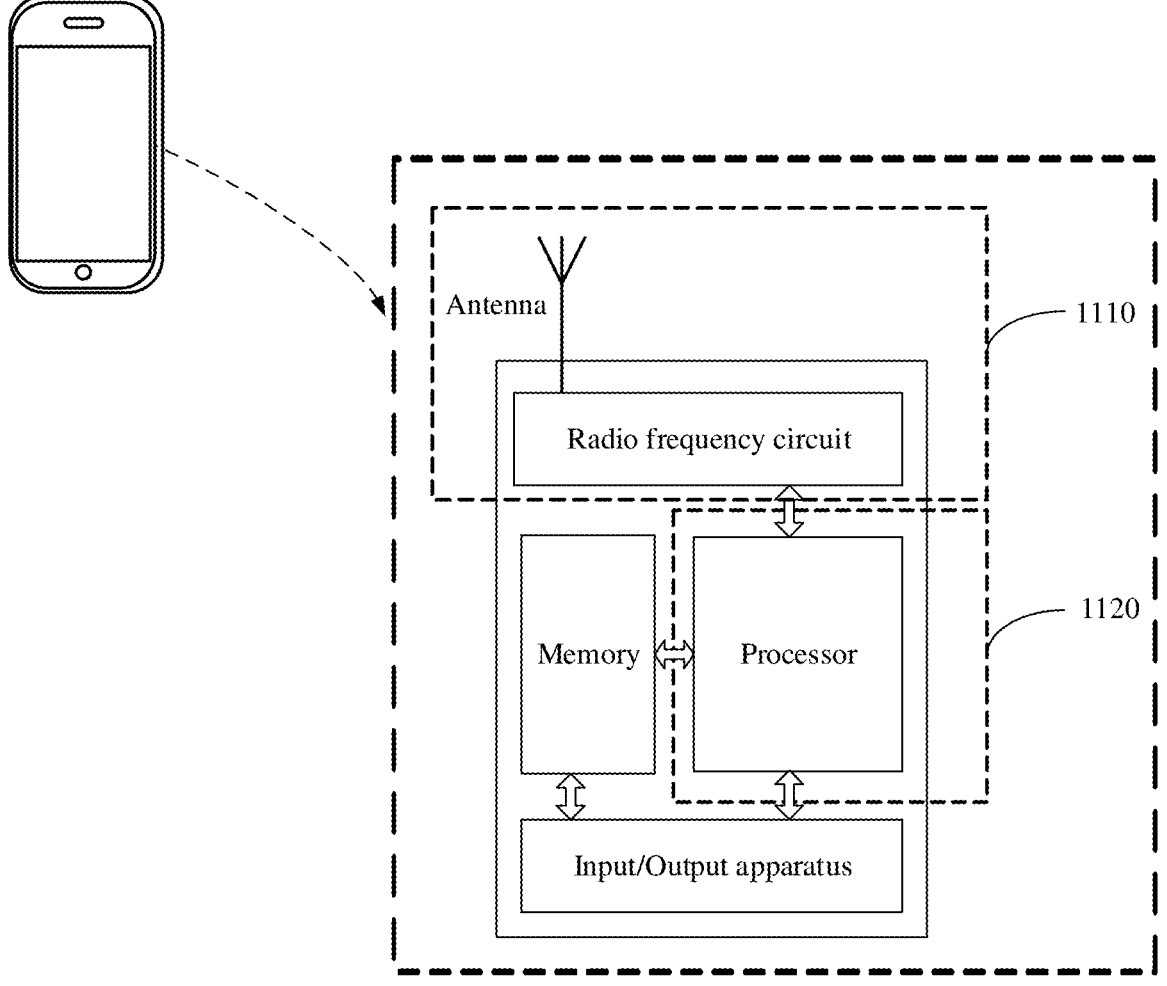
FIG. 11 is a schematic diagram of a structure of a terminal device according to an embodiment of this disclosure.

The following shows a possible schematic diagram of a structure of a communication apparatus that is a terminal device in FIG. 11.

FIG. 11 is a simplified schematic diagram of a structure of a terminal device. For ease of understanding and illustration, an example in which the terminal device is a mobile phone is used in FIG. 11. As shown in FIG. 11, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is configured to store the software program and the data. A radio frequency circuit is mainly configured to: perform conversion between a baseband signal and a radio frequency signal, and process the radio frequency signal. The antenna is mainly configured to receive and send the radio frequency signal in a form of an electromagnetic wave. The input/output apparatus, such as a touchscreen, a display, or a keyboard, is mainly configured to: receive data input by a user and output data to the user. It should be noted that terminal devices of some types may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to outside in a form of an electromagnetic wave by using the antenna. When data needs to be sent to the terminal device, the radio frequency circuit receives a radio frequency signal through the antenna, converts the radio frequency signal into a baseband signal, and outputs the baseband signal to the processor, and the processor converts the baseband signal into data, and processes the data. For ease of description, FIG. 11 shows only one memory and one processor. In an actual terminal device product, there may be one or more processors and one or more memories. The memory may also be referred to as a storage medium, a storage device, or the like. The memory may be disposed independently of the processor, or may be integrated with the processor. This is not limited in this embodiment of this disclosure.

In this embodiment of this disclosure, the antenna and a radio frequency circuit that have a transceiver function may be considered as a transceiver unit of the terminal device, and a processor that has a processing function may be considered as a processing unit of the terminal device. As shown in FIG. 11, the terminal device includes a transceiver unit 1110 and a processing unit 1120. The transceiver unit may alternatively be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1110 and that is configured to implement a receiving function may be considered as a receiving unit, and a component that is in the transceiver unit 1110 and that is configured to implement a sending function may be considered as a sending unit. That is, the transceiver unit 1110 includes the receiving unit and the sending unit. The transceiver unit may sometimes be referred to as a transceiver machine, a transceiver, a transceiver circuit, or the like. The receiving unit may also be sometimes referred to as a receiver, a receiver machine, a receiver circuit, or the like. The sending unit sometimes may also be referred to as a transmitter, a transmitter machine, a transmitter circuit, or the like.

It should be understood that the transceiver unit 1110 is configured to perform a sending operation and a receiving operation on the terminal device in the foregoing method embodiments, and the processing unit 1120 is configured to perform an operation other than the sending operation and the receiving operation on the terminal device in the foregoing method embodiments.

For example, in a possible implementation, the processing unit 1120 is configured to perform step 201 and step 202 in FIG. 2.

Optionally, the transceiver unit 1110 is configured to perform step 201*b* and step 201*c* in FIG. 2.

For example, in a possible implementation, the transceiver unit 1110 is configured to perform step 501 in FIG. 5. Optionally, the transceiver unit 1110 is further configured to perform step 501*a* in FIG. 5.

For example, in a possible implementation, the transceiver unit 1110 is configured to perform step 801 in FIG. 8. Optionally, the transceiver unit 1110 is further configured to perform step 801*a* in FIG. 8.

When the third terminal device is a chip, the chip includes a transceiver unit and a processing unit. The transceiver unit may be an input/output circuit or a communication interface. The processing unit is a processor, a microprocessor, an integrated circuit, or a logical circuit integrated on the chip.

Figure 12:
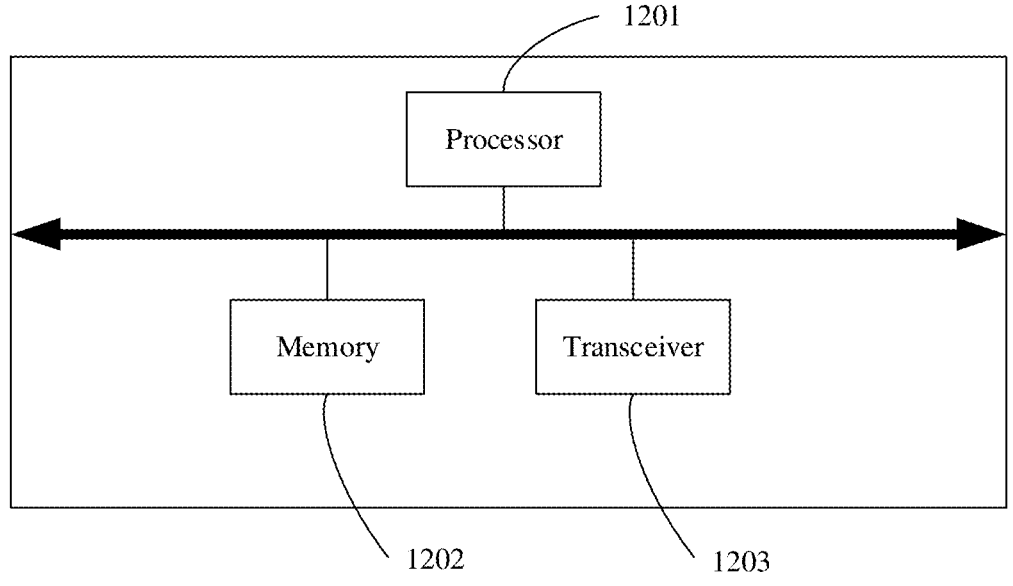
FIG. 12 is a schematic diagram of another structure of a communication processing apparatus according to an embodiment of this disclosure.

This disclosure further provides a communication processing apparatus. FIG. 12 is a schematic diagram of another structure of a communication processing apparatus according to an embodiment of this disclosure. The communication processing apparatus may be configured to perform the steps performed by the communication processing apparatus in embodiments shown in FIG. 2, FIG. 5, and FIG. 8. For details, refer to the related descriptions in the foregoing method embodiments.

The communication processing apparatus includes a processor 1201 and a memory 1202. Optionally, the communication processing apparatus further includes a transceiver 1203.

In a possible implementation, the processor 1201, the memory 1202, and the transceiver 1203 are separately connected by using a bus, and the memory stores computer instructions.

The processing module 1001 in the foregoing embodiment may be the processor 1201 in this embodiment. The transceiver module 1002 in the foregoing embodiment may be the transceiver 1203 in this embodiment.

Figure 13:
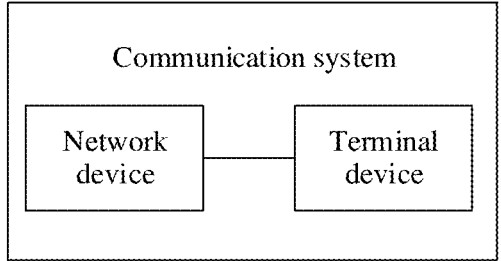
FIG. 13 is a schematic diagram of a communication system according to an embodiment of this disclosure.

Refer to FIG. 13. An embodiment of this disclosure further provides a communication system, and the communication system includes a terminal device and a network device. The terminal device is configured to perform all or some of the steps performed by the terminal device in embodiments shown in FIG. 2, FIG. 5, and FIG. 8, and the network device is configured to perform all or some of the steps performed by the network device in embodiments shown in FIG. 2, FIG. 5, and FIG. 8. For details, refer to the related descriptions in the foregoing method embodiments.

An embodiment of this disclosure further provides a computer program product including instructions. When the computer program product is run on a computer, the computer is enabled to perform the communication processing method in embodiments shown in FIG. 2, FIG. 5, and FIG. 8.

An embodiment of this disclosure further provides a computer-readable storage medium, including computer instructions. When the computer instructions are run on a computer, the computer is enabled to perform the communication processing method in embodiments shown in FIG. 2, FIG. 5, and FIG. 8.

An embodiment of this disclosure further provides a chip apparatus, including a processor, configured to be connected to a memory, and invoke a program stored in the memory, to enable the processor to perform the communication processing method in embodiments shown in FIG. 2, FIG. 5, and FIG. 8.

The processor mentioned anywhere above may be a general-purpose central processing unit, a microprocessor, an application-specific integrated circuit (ASIC), or one or more integrated circuits for controlling program execution of the communication processing method in embodiments shown in FIG. 2, FIG. 5, and FIG. 8. The memory mentioned anywhere above may be a read-only memory (ROM), another type of static storage device that can store static information and instructions, a random access memory (RAM), or the like.

It may be clearly understood by a person skilled in the art that, for the purpose of convenient and brief description, for a detailed working process of the foregoing system, apparatus, and unit, refer to a corresponding process in the foregoing method embodiments.

In the several embodiments provided in this disclosure, it can be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in this embodiment.

In addition, functional units in embodiments of this disclosure may be integrated into one processing unit, each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of this disclosure essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this disclosure. The foregoing storage medium includes any medium that can store program code, for example, a USB flash drive, a removable hard disk, a read-only memory (ROM), a random access memory (RAM), a floppy disk, or a compact disc.

In conclusion, the foregoing embodiments are merely intended for describing the technical solutions of this disclosure, but not for limiting this disclosure. Although this disclosure is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this disclosure.

What is claimed is:

1. A communication processing method, wherein the method comprises:

determining, by a terminal device, first weight vectors respectively corresponding to M antenna element set groups, wherein at least one antenna element set group in the M antenna element set groups comprises at least two antenna element sets, a each first weight vector corresponding to a respective one of the at least one antenna element set group comprises at least two elements, wherein each element of the at least two elements corresponds to a respective antenna element set in the respective one of the at least one antenna element set group, said each element indicates an adjustment to a phase of an antenna element comprised in the antenna element set corresponding to the element, different elements of the at least two elements correspond to different antenna element sets, and M is an integer greater than or equal to 1; and sending, by the terminal device based on the first weight vectors respectively corresponding to the M antenna element set groups, a signal on antenna elements comprised in the M antenna element set groups.

2. The method according to claim 1, wherein the method further comprises:

receiving, by the terminal device, indication information from a network device, wherein the indication information indicates the first weight vectors respectively corresponding to the M antenna element set groups; and the determining, by a terminal device, first weight vectors respectively corresponding to M antenna element set groups comprises:

determining, by the terminal device based on the indication information, the first weight vectors respectively corresponding to the M antenna element set groups.

3. The method according to claim 2, wherein the receiving, by the terminal device, indication information from a network device comprises:

receiving, by the terminal device, downlink control information (DCI) from the network device, wherein the DCI carries indication information of the first weight vectors respectively corresponding to the M antenna element set groups.

4. The method according to claim 3, wherein the DCI comprises an analog transmit precoding matrix indication (A-TPMI), and the A-TPMI indicates a precoding matrix and the first weight vector.

5. The method according to claim 2, wherein the indication information indicates index information of the first weight vectors; and the determining, by the terminal device based on the indication information, the first weight vectors respectively corresponding to the M antenna element set groups comprises: determining, by the terminal device based on the index information, the first weight vectors respectively corresponding to the M antenna element set groups;

the indication information indicates phase information of an element in the first weight vectors; and the determining, by the terminal device based on the indication information, the first weight vectors respectively corresponding to the M antenna element set groups comprises: determining, by the terminal device based on the phase information of the element, the first weight vectors respectively corresponding to the M antenna element set groups; or the indication information indicates a plurality of amplitude-phase weighted values, the amplitude-phase weighted value comprises a plurality of elements, and each element in the amplitude-phase weighted value is corresponding to one second weight vector of a plurality of second weight vectors; and the determining, by the terminal device based on the indication information, the first weight vectors respectively corresponding to the M antenna element set groups comprises:

determining, by the terminal device based on the amplitude-phase weighted value and the plurality of second weight vectors, a plurality of third weight vectors; and determining, by the terminal device based on the plurality of third weight vectors, the first weight vectors respectively corresponding to the M antenna element set groups.

6. The method according to claim 1, wherein the M antenna element set groups comprise a first antenna element set group, and the first antenna element set group comprises at least two antenna element sets; and the method further comprises:

sending, by the terminal device, sounding reference signals to a network device on antenna elements comprised in the first antenna element set group by using N resources, wherein time domain resources respectively occupied by the N resources are different, the sounding reference signals sent on the N resources are based on different second weight vectors of the first antenna element set group, each second weight vector of the different second weight vectors comprises at least two elements, each of the at least two elements corresponds to a respective antenna element set comprised in the first antenna element set group, each of the at least two elements indicates an adjustment to a phase of an antenna element comprised in the antenna element set corresponding to the each of the at least two elements, and different elements of the at least two elements correspond to different antenna element sets in the at least two antenna element sets.

7. The method according to claim 6, wherein the time domain resources respectively occupied by the N resources are consecutive.

8. The method according to claim 6, wherein N is a quantity of antenna element sets comprised in the first antenna element set group.

9. The method according to claim 6, wherein the N resources correspond to N second weight vectors; and if the second weight vector is a column vector, any two row vectors in a first matrix formed by the N second weight vectors are orthogonal to each other; or if the second weight vector is a row vector, any two column vectors in a second matrix formed by the N second weight vectors are orthogonal to each other.

10. The method according to claim 9, wherein each row vector of the first matrix is an orthogonal code.

11. The method according to claim 10, wherein the orthogonal code comprises any one of an orthogonal cover code (OCC), a discrete Fourier transformation (DFT) code, or a time domain code division multiplexing (TD-CDM) code.

12. The method according to claim 9, wherein each column vector of the second matrix is an orthogonal code.

13. The method according to claim 9, wherein the N second weight vectors comprise two second weight vectors, and orthogonal codes of the two second weight vectors are $[1\ 1]^T$ and $[1\ -1]^T$; or the N second weight vectors comprise four second weight vectors, and orthogonal codes of the four second weight vectors are respectively $[1\ 1\ 1\ 1]^T$, $[1\ 1\ -1\ -1]^T$, $[1\ -1\ 1\ -1]^T$, and $[1\ -1\ -1]^T$.

14. The method according to claim 9, wherein the N second weight vectors comprise two second weight vectors, and orthogonal codes of the two second weight vectors are respectively $[1\ 1]$ and $[1\ -1]$; or the N second weight vectors comprise four second weight vectors, and orthogonal codes of the four second weight vectors are respectively $[1\ 1\ 1\ 1]$, $[1\ 1\ -1\ -1]$, $[1\ -1\ 1\ -1]$, and $[1\ -1\ -1\ 1]$.

15. The method according to claim 6, wherein the sounding reference signals sent on different resources in the N resources have different sequences.

16. The method according to claim 6, wherein the method further comprises:

receiving, by the terminal device, configuration information from the network device, wherein the configuration information comprises time-frequency position information of the N resources and the N second weight vectors corresponding to the N resources.

17. The method according to claim 1, wherein the sending, by the terminal device based on the first weight vector, a signal on antenna elements comprised in the M antenna element set groups comprises:

determining, by the terminal device, a first phase-shift value based on a transmission configuration indicator (TCI) state and a synchronization signal and physical broadcast channel block index associated with the TCI state; or determining, by the terminal device, the first phase-shift value based on the TCI state and a non-zero power channel state information reference signal (CSI-RS) resource index associated with the TCI state;

separately adjusting, by the terminal device based on the first weight vector and the first phase-shift value, phase-shift values of the antenna elements comprised in the M antenna element set groups; and sending, by the terminal device, the signal through the antenna elements comprised in the M antenna element set groups.

18. The method according to claim 1, wherein the method further comprises:

sending, by the terminal device, capability information to a network device, wherein the capability information comprises at least one of information indicating whether the terminal device supports division of antenna elements into antenna element sets, a quantity of antenna element sets supported by the terminal device, or an arrangement manner of the antenna element sets of the terminal device.

19. A device, comprising:

a processor; and a non-transitory computer-readable storage medium storing a computer program instructions to be executed by the processor, the computer program instructions including instructions to:

determine first weight vectors respectively corresponding to M antenna element set groups, wherein at least one antenna element set group in the M antenna element set groups comprises at least two antenna element sets, a each first weight vector corresponding to a respective one of the at least one antenna element set group comprises at least two elements, wherein each element of the at least two elements corresponds to a respective antenna element set in the respective one of the at least one antenna element set group, said each element indicates an adjustment to a phase of an antenna element comprised in the antenna element set corresponding to the element, different elements of the at least two elements correspond to different antenna element sets, and M is an integer greater than or equal to 1; and send based on the first weight vectors respectively corresponding to the M antenna element set groups, a signal on antenna elements comprised in the M antenna element set groups.

20. The device according to claim 19, wherein the computer program instructions further including instructions to:

receive indication information from a network device, wherein the indication information indicates the first weight vectors respectively corresponding to the M antenna element set groups; and determine based on the indication information, the first weight vectors respectively corresponding to the M antenna element set groups.

* * * * *